US009053196B2

(12) United States Patent
Ratzlaff et al.

(10) Patent No.: US 9,053,196 B2
(45) Date of Patent: Jun. 9, 2015

(54) METHODS FOR INTERACTING WITH AND MANIPULATING INFORMATION AND SYSTEMS THEREOF

(75) Inventors: Cordell Ratzlaff, Palo Alto, CA (US); Gaspard de Dreuzy, New York, NY (US); Serge Kreiker, New York, NY (US); Frederic Markus, Carlsbad, CA (US)

(73) Assignee: COMMERCE STUDIOS LLC, INC., New York, NY (US)

( * ) Notice: Subject to any disclaimer, the term of this patent is extended or adjusted under 35 U.S.C. 154(b) by 842 days.

(21) Appl. No.: 12/463,937

(22) Filed: May 11, 2009

(65) Prior Publication Data
US 2010/0005409 A1    Jan. 7, 2010

Related U.S. Application Data

(60) Provisional application No. 61/051,998, filed on May 9, 2008.

(51) Int. Cl.
*G06F 3/048* (2013.01)
*G06F 17/30* (2006.01)

(52) U.S. Cl.
CPC ................. *G06F 17/30873* (2013.01)

(58) Field of Classification Search
USPC .................... 715/765, 854; 718/100
See application file for complete search history.

(56) References Cited

U.S. PATENT DOCUMENTS 5,339,392 A * 8/1994 Risberg et al. ............... 715/762
5,586,311 A * 12/1996 Davies et al. ................. 715/764
5,644,737 A * 7/1997 Tuniman et al. ............. 715/810
5,675,746 A    10/1997 Marshall
5,774,878 A    6/1998 Marshall
6,002,401 A    12/1999 Baker
6,023,273 A * 2/2000 Cox et al. .................... 715/764
6,065,047 A * 5/2000 Carpenter et al. ........... 709/218

(Continued)

FOREIGN PATENT DOCUMENTS

JP    2003-177854    6/2003
JP    2009-098825    5/2009

OTHER PUBLICATIONS

International Search Report for International Patent Application No. PCT/US10/34099 (Jul. 1, 2010).

(Continued)

*Primary Examiner* — Stephen Alvesteffer
(74) *Attorney, Agent, or Firm* — Nixon Peabody LLP

(57) ABSTRACT

A method, computer readable medium and system for providing an interactive desktop and/or browser-based information workspace (or "playground") includes obtaining at a workspace management processing system a selection of one or more condensed information objects and one or more of application tools. A customized interactive workspace for non-video game based information in a video game display graphical user interface format is provided to the computing system from the workspace management processing system based on a default interactive workspace populated with the selected one or more condensed information objects and one or more application tools. The customized interactive workspace is configured to enable at least one of the one or more application tools to act upon, affect or interact with at least one of the one or more condensed information objects from within the customized interactive workspace and the customized interactive workspace.

84 Claims, 17 Drawing Sheets

(56) References Cited

U.S. PATENT DOCUMENTS

| | | | |
|---|---|---|---|
| 6,115,036 A * | 9/2000 | Yamato et al. | 715/723 |
| 6,466,239 B2 | 10/2002 | Ishikawa | |
| 6,709,330 B1 | 3/2004 | Klein et al. | |
| 6,729,884 B1 | 5/2004 | Kelton et al. | |
| 6,890,179 B2 | 5/2005 | Rogan et al. | |
| 7,107,549 B2 | 9/2006 | Deaton et al. | |
| 7,207,885 B2 | 4/2007 | Longman | |
| 7,231,608 B1 | 6/2007 | Fano et al. | |
| 7,249,139 B2 | 7/2007 | Chuah et al. | |
| 7,300,352 B2 * | 11/2007 | Rowe | 463/32 |
| 7,412,389 B2 | 8/2008 | Yang | |
| 7,460,021 B1 * | 12/2008 | Bacon | 340/601 |
| 7,478,047 B2 | 1/2009 | Loyall et al. | |
| 7,512,555 B2 | 3/2009 | Finn | |
| 7,523,440 B2 * | 4/2009 | Torgerson et al. | 717/110 |
| 7,529,690 B2 | 5/2009 | Hadi | |
| 7,645,194 B2 | 1/2010 | Van Luchene et al. | |
| 7,657,477 B1 | 2/2010 | Chaffee | |
| 7,668,726 B2 | 2/2010 | Cardno et al. | |
| 7,680,694 B2 | 3/2010 | Glazer et al. | |
| 7,690,990 B2 | 4/2010 | Van Luchene | |
| 7,761,339 B2 | 7/2010 | Alivandi | |
| 7,783,552 B2 | 8/2010 | Assia et al. | |
| 7,788,146 B2 | 8/2010 | McCarthy | |
| 7,890,419 B2 | 2/2011 | Jung et al. | |
| 7,991,706 B2 | 8/2011 | Mattern | |
| 7,997,969 B1 | 8/2011 | Murrell et al. | |
| 8,069,095 B2 | 11/2011 | Glazer et al. | |
| 8,070,599 B2 | 12/2011 | Van Luchene | |
| 8,132,111 B2 | 3/2012 | Baron et al. | |
| 8,160,893 B2 | 4/2012 | Cardno et al. | |
| 8,209,250 B2 | 6/2012 | Bradway et al. | |
| 8,239,487 B1 | 8/2012 | Hoffman et al. | |
| 8,253,735 B2 | 8/2012 | Shuster | |
| 8,255,807 B2 | 8/2012 | Ganz et al. | |
| 8,262,447 B2 | 9/2012 | Murrell et al. | |
| 8,277,315 B2 | 10/2012 | Burak et al. | |
| 8,297,621 B1 | 10/2012 | Chao et al. | |
| 8,321,797 B2 | 11/2012 | Perkins | |
| 8,326,704 B2 | 12/2012 | Glazer et al. | |
| 8,341,022 B2 | 12/2012 | Edwards | |
| 8,346,646 B2 | 1/2013 | Cutler et al. | |
| 8,350,843 B2 | 1/2013 | Rogowitz et al. | |
| 8,386,414 B2 | 2/2013 | Bromenshenkel et al. | |
| 8,386,918 B2 | 2/2013 | Do et al. | |
| 8,398,490 B1 | 3/2013 | Phelon et al. | |
| 8,457,991 B2 | 6/2013 | Jung et al. | |
| 8,462,162 B2 | 6/2013 | Careri et al. | |
| 8,487,749 B2 | 7/2013 | Borrel et al. | |
| 8,525,834 B2 | 9/2013 | Salemann | |
| 8,533,610 B2 | 9/2013 | Fujioka | |
| 8,554,639 B2 | 10/2013 | Dollens | |
| 8,572,177 B2 | 10/2013 | Goldman et al. | |
| 2002/0099679 A1 * | 7/2002 | Usitalo et al. | 706/46 |
| 2002/0158917 A1 * | 10/2002 | Sinclair et al. | 345/850 |
| 2002/0178096 A1 | 11/2002 | Marshall | |
| 2003/0043144 A1 | 3/2003 | Pundarika et al. | |
| 2003/0156141 A1 * | 8/2003 | Good et al. | 345/810 |
| 2004/0032410 A1 | 2/2004 | Ryan | |
| 2004/0109031 A1 | 6/2004 | Deaton et al. | |
| 2004/0139106 A1 * | 7/2004 | Bachman et al. | 707/104.1 |
| 2005/0009608 A1 | 1/2005 | Robarts et al. | |
| 2005/0203767 A1 | 9/2005 | Rogan et al. | |
| 2006/0242584 A1 * | 10/2006 | Johanson et al. | 715/738 |
| 2007/0097832 A1 | 5/2007 | Koivisto et al. | |
| 2007/0100705 A1 | 5/2007 | Chen | |
| 2007/0150810 A1 * | 6/2007 | Katz et al. | 715/526 |
| 2007/0155508 A1 | 7/2007 | Sun et al. | |
| 2007/0180389 A1 | 8/2007 | Holm et al. | |
| 2007/0191113 A1 | 8/2007 | Longman | |
| 2007/0191114 A1 | 8/2007 | Longman | |
| 2007/0192203 A1 | 8/2007 | Di Stefano | |
| 2007/0198939 A1 * | 8/2007 | Gold | 715/757 |
| 2008/0103951 A1 | 5/2008 | Jung et al. | |
| 2008/0109338 A1 | 5/2008 | Jung et al. | |
| 2008/0163379 A1 | 7/2008 | Robinson et al. | |
| 2008/0288362 A1 | 11/2008 | King | |
| 2009/0017426 A1 * | 1/2009 | Higgins | 434/128 |
| 2009/0061995 A1 | 3/2009 | Assia et al. | |
| 2009/0062016 A1 | 3/2009 | Assia et al. | |
| 2009/0100015 A1 * | 4/2009 | Golan | 707/3 |
| 2009/0100377 A1 | 4/2009 | Miyamoto et al. | |
| 2009/0113349 A1 | 4/2009 | Zohar et al. | |
| 2009/0186678 A1 | 7/2009 | Tirosh | |
| 2009/0298019 A1 | 12/2009 | Rogan et al. | |
| 2010/0127968 A1 | 5/2010 | Kramer et al. | |
| 2010/0248192 A1 | 9/2010 | Thompson et al. | |
| 2011/0040638 A1 | 2/2011 | Rabenold et al. | |
| 2011/0066938 A1 | 3/2011 | Nageswaram et al. | |
| 2011/0229860 A1 | 9/2011 | Leventhal et al. | |
| 2011/0265041 A1 | 10/2011 | Ganetakos et al. | |
| 2012/0035927 A1 | 2/2012 | Yamada et al. | |
| 2012/0221433 A1 | 8/2012 | Plattsmier et al. | |
| 2012/0290435 A1 | 11/2012 | Trotman et al. | |
| 2013/0027409 A1 | 1/2013 | Indelicato et al. | |
| 2013/0050199 A1 | 2/2013 | Chavez | |
| 2013/0066750 A1 | 3/2013 | Siddique et al. | |
| 2013/0066751 A1 | 3/2013 | Glazer et al. | |
| 2013/0085807 A1 | 4/2013 | Cincotta | |
| 2013/0086483 A1 | 4/2013 | Vainer et al. | |
| 2013/0091132 A1 | 4/2013 | Khalatov et al. | |
| 2013/0091456 A1 | 4/2013 | Sherman et al. | |
| 2013/0122980 A1 | 5/2013 | Lachina et al. | |
| 2013/0124382 A1 | 5/2013 | Cutler et al. | |
| 2013/0218542 A1 | 8/2013 | Yerli | |

OTHER PUBLICATIONS

Written Opinion of the International Searching Authority for International Patent Application No. PCT/US10/34099 (Jun. 21, 2010).

* cited by examiner

METHODS FOR INTERACTING WITH AND MANIPULATING INFORMATION AND SYSTEMS THEREOF

This application claims the benefit of U.S. Provisional Patent Application Ser. No. 61/051,998, filed May 9, 2008, which is hereby incorporated by reference in its entirety.

FIELD OF THE INVENTION

This invention relates to methods and system for interacting with and manipulating information, such as financial information or sport information.

BACKGROUND

For a large number of individuals the Internet has become one of the primary sources for information, ranging from financial to sporting news and data. This information can be very helpful to users providing them with necessary data to make a variety of short and long term decisions. Unfortunately, the volume of available data on the Internet is growing exponentially and the format in which it is provided is often complicated, confusing, and static. As a result, individuals sometime fail to identify and analyze the most pertinent information for their short and long term decisions.

SUMMARY

A method for providing an interactive information workspace (or "playground") in accordance with embodiments of the present invention includes obtaining at a workspace management processing system a selection of one or more condensed information objects and one or more application tools. A customized interactive workspace for non-video game based information in a video game display graphical user interface format is provided to the computing system from the workspace management processing system based on a default interactive workspace that provides a frame and includes the selected one or more condensed information objects and one or more application tools. The customized interactive workspace is configured to enable at least one of the one or more application tools to interact with at least one of the one or more condensed information objects from within the customized interactive workspace and the customized interactive workspace.

A computer readable medium having stored thereon instructions for providing an interactive information workspace comprising machine executable code which when executed by at least one processor, causes the processor to perform steps including obtaining at a workspace management processing system a selection of one or more condensed information objects and one or more application tools. A customized interactive workspace for non-video game based information in a video game display graphical user interface format is provided to the computing system from the workspace management processing system based on a default interactive workspace populated with the selected one or more condensed information objects and one or more application tools. The customized interactive workspace is configured to enable at least one of the one or more application tools to interact with at least one of the one or more condensed information objects from within the customized interactive workspace and the customized interactive workspace.

An interactive information provider system in accordance with other embodiments of the present invention includes a customization system and a processing system at a computing system. The customization system obtains a selection of one or more condensed information objects and one or more of application tools. The workspace processing system provides a customized interactive workspace for non-video game based information in a video game display graphical user interface format based on a default interactive workspace populated with the selected one or more condensed information objects and the selected one or more analytic tools, the customized interactive workspace is configured to enable at least one of the selected one or more analytic tools to interact with at least one of the selected one or more condensed information objects from within the customized interactive workspace and the customized interactive workspace.

A method for interacting with and manipulating information in accordance with other embodiments of the present invention includes displaying at least one interactive customizable workspace for non-video game based information in a video game display format. One or more information objects are provided and contained in the customized interactive workspace. At least one action is performed on at least one of the user-selected information objects and the customized interactive workspace via at least one of an application tool and a feature operation. The customized interactive workspace is displayed based on results of the performed action on the at least one of the information objects.

A computer readable medium in accordance with other embodiments of the present invention includes having stored thereon instructions for methods for interacting with and manipulating information comprising machine executable code which when executed by at least one processor, causes the processor to perform steps including displaying at least one interactive customizable workspace for non-video game based information in a video game display graphical user interface format. One or more information objects are provided and contained in the customized interactive workspace. At least one action is performed on at least one of the information objects via at least one of an application tool and a feature operation. The customized interactive workspace is displayed based on results of the performed action on the at least one of the information objects.

A system that interacts with and manipulates information in accordance with other embodiments of the present invention includes a display system and an interaction processing system in a computing system. The display system displays one or more selected information objects in an interactive customizable workspace for non-video game based information in a video game display graphical user interface format. The interaction processing system performs at least one action on at least one of the information objects via at least one of an application tool and a feature operation. The display system displays the interactive customizable workspace based on the performed action on the at least one of the information objects.

The present invention provides a number of advantages including providing a more effective method, computer readable medium and system for interacting with and manipulating information in a customized interactive workspace modeled through a video game metaphor and that provides a frame and a container for information objects. For example, with the present invention financial information, such as in-depth information on stocks and mutual funds, is much easier to search, understand, manipulate, share, and analyze to enhance the efficiency and ease of use from within one single, integrated system modeled through a video game-metaphor. Additionally, the present invention provides this interaction with information in a much more graphical and intuitive manner through a type of graphical user interface that offers graphical icons, and visual indicators. As a result, with the present invention individuals are not only able to easily obtain and interact with information they need, but are motivated to do so because of the ease with which the present invention represents and makes this information available to them. Further, the present invention provides a method for interacting with information that may include one or more of tools that act upon information objects, user-directed controls, full screen graphics, instant or real-time communication with peer computing systems, information overlays, instant or real-time feedback, user profiles, displayed performance results measured against metrics, and a modern, unique and user friendly graphical user interface (GUI).

BRIEF DESCRIPTION OF THE DRAWINGS

Figure 4:
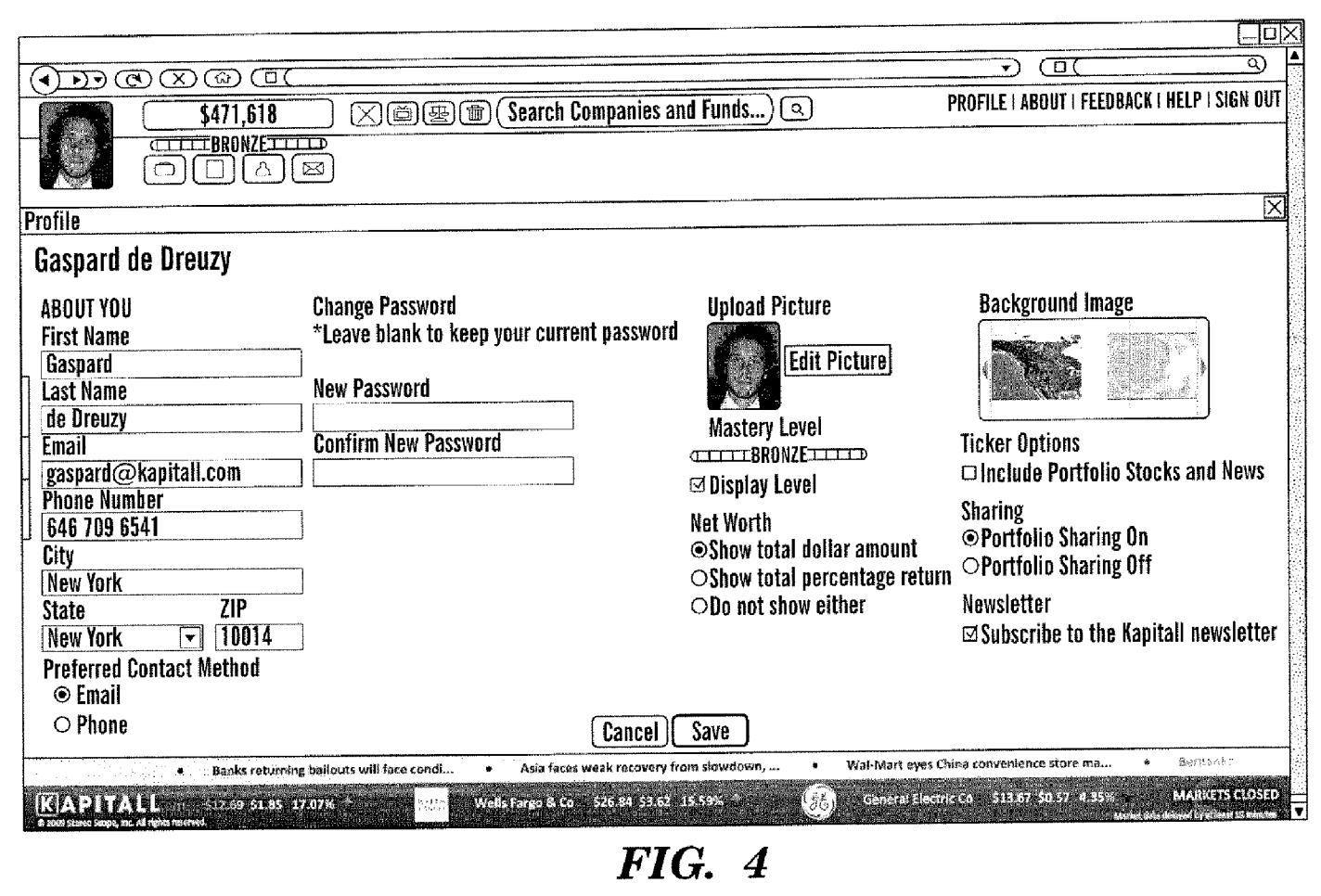

FIG. 4 is a screen shot of entering data in a user profile associated with an exemplary customized interactive workspace;

FIGS. 10A and 10B are screen shots of initiating information objects and displaying the information encapsulated in the objects in the exemplary customized interactive workspace;

DETAILED DESCRIPTION

Figure 1:
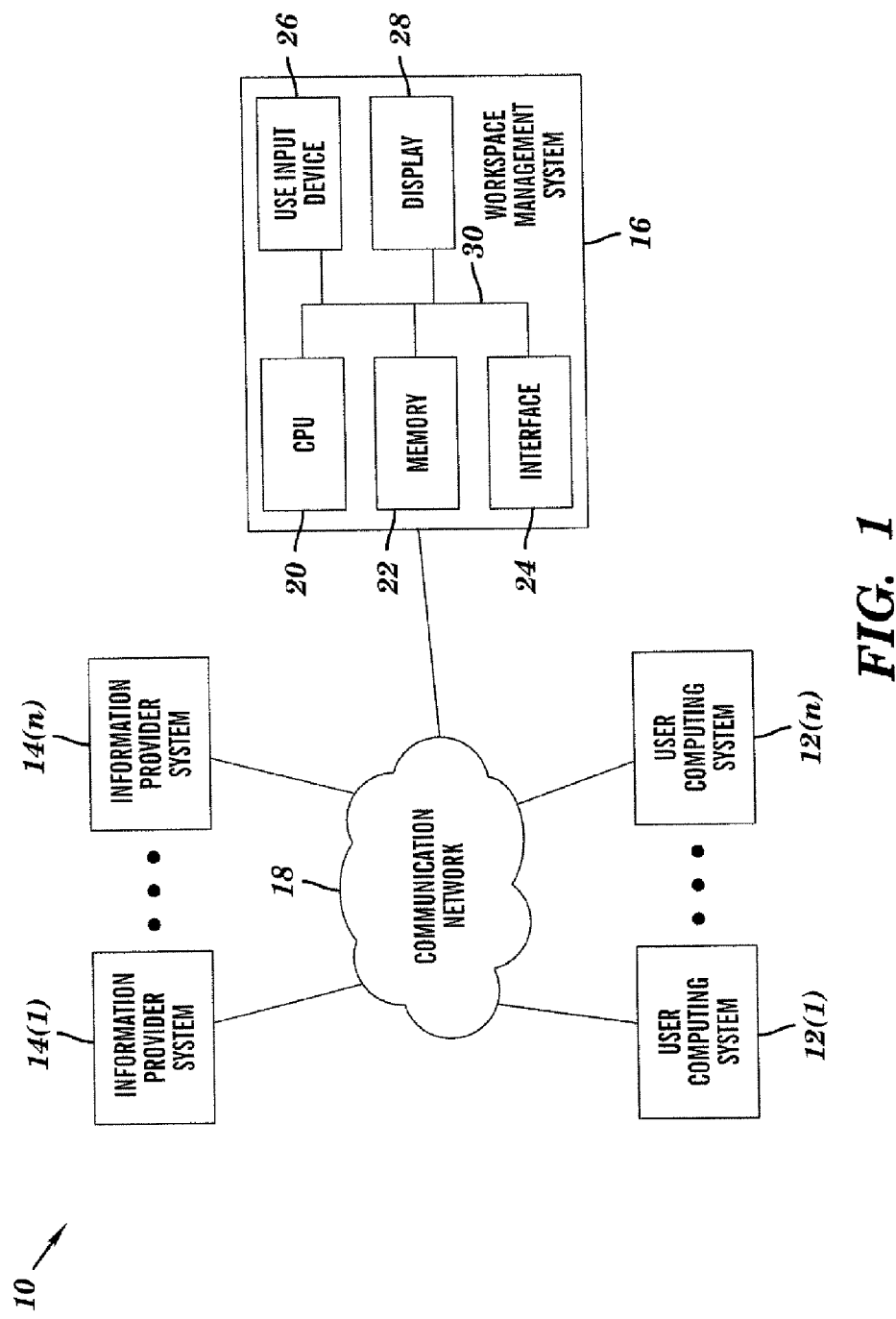
FIG. 1 is a block diagram of an information management system in accordance with embodiments of the present invention.

An information management system 10 in accordance with embodiments of the present invention is illustrated in FIG. 1. By way of example only, the information managements system 10 illustrated and described herein is utilized with interacting with and manipulating financial information, although the system can be used with other types and amounts of information, such as non-video game information by way of example only. The information management system 10 includes a plurality of user computing systems 12(1)-12(n), a plurality of object information provider systems 14(1)-14(n), a workspace management processing system 16, and a communication network 18, although the system can include other numbers and types of systems, devices, equipment, parts, components, and/or elements in other configurations. The present invention provides a number of advantages including providing a more effective method, computer readable medium and system for interacting with for information in a customized interactive workspace configured in a video game display graphical user interface format.

Referring more specifically to FIG. 1, each of the plurality of user computing systems 12(1)-12(n) enables a user to access and interact with one or more interactive desktop and/or browser-based workspaces or workspaces, although other numbers and types of systems could be used for interacting with one or more interactive workspaces. A variety of different types of users computing system may utilize the present invention, such as an investment management computing system by way of example only. A workspace or "playground" is a virtual desktop and/or browser-based interactive space that contains content and information objects that can be acted upon by application tools, although the workspace can contain other types and amounts of data. In these embodiments, the workspace organizes information in a video game display graphical user interface format, although other types of formats could be used. A graphical user interface (GUI) is a type of user interface that offers graphical icons, and visual indicators, as opposed to text-based interfaces, typed command labels or text navigation to fully represent the information and actions available to a user. In these embodiments, actions are usually performed through direct manipulation of the graphical elements, although actions can be performed in other manners. The graphical user interface provides a platform a user can interact with for the tasks of gathering and producing information. A video game display format graphical user interface is a graphical user interface which includes information objects, full screen graphics, tools that affect objects, user directed control, instant communication with peers, information overlay, instant feedback, user profiles, multiple levels that require and help operators to advance in knowledge and skill, and performance measurements against metrics, although a video game display graphical user interface formats can include other numbers and types of aspects in other greater or lesser combinations of these elements. With respect to the different levels, in these embodiments the customized interactive workspace is adjusted or customized to have information objects, tools and other items displayed and accessible based on a determined level of skill of the operator and may optionally provide additional information objects, tools and other items, although the customized interactive workspace can be adjusted in other manners based on the skill level. The video game format for the customizable interactive workspace provides a more graphical, intuitive and user-friendly type of graphical user interface that offers graphical icons, visual indicators and levels based on experience of the operator. In contrast, prior displays for information typically are modeled after less intuitive and less user friendly print media of simple columns and rows.

An information object comprises a computer interface element that is a visual front to the underlying data other information that it represents and encapsulates. The information object visually represents the information or other data as an independent user interface component that displays basic characteristics, such as an attribute-like name or attribute-like price, of the information it encapsulates. One characteristic or other attribute of the information that an information object represents is that it can vary in real time based upon changes to data received from one of the information provider systems 14(1)-14(n) via a communications network 18, although it can have other numbers and types of characteristics. A variety of different types of actions can be performed on information objects including: searching; adding and removing; moving, dragging and dropping; initiating opening and closing; sending and receiving from peers; analyzing (e.g. comparing); storing; altering; grouping (to create lists); and browsing related information objects, although other types and numbers of action could be performed on the information objects.

In these embodiments, application tools depend and act on information objects, although other types and numbers of tools and tools which do not depend on any objects or locate, display and create specific information objects can be used. Additionally, in these embodiments the tools can be contextual based on the information objects in the customized interactive workspace, although one or more of the tools may not depend on any information object. A feature operation is an action which can be executed on the customized interactive workspace, such as changing background graphics, font size or screen size by way of example, although other types and numbers of feature operations can be executed.

Each of the user computing systems 12(1)-12(n) includes a central processing unit (CPU) or processor, a memory, user input device, a display, and an interface system, and which are coupled together by a bus or other link, although each of the user computing systems 12(1)-12(n) can include other numbers and types of components, parts, devices, systems, and elements in other configurations. The processor in each of the user computing systems 12(1)-12(n) executes a program of stored instructions for one or more aspects of the present invention as described and illustrated herein, although the processor could execute other numbers and types of programmed instructions.

The memory in each of the user computing systems 12(1)-12(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, or other computer readable medium which is read from and/or written to by a magnetic, optical, or other reading and/or writing system that is coupled to one or more processors, can be used for the memory in each of the user computing systems 12(1)-12(n).

The user input device in each of the user computing systems 12(1)-12(n) is used to input selections, such as requests for an action or operation or requests for an analysis with an application tool, although the user input device could be used to input other types of data and actions and interact with other elements. The user input device can include a computer keyboard and a computer mouse, although other types and numbers of user input devices can be used, such as (but not limited to) a video game console controller, a mobile communications device keyboard, and a TV remote controller. The display in each of the user computing systems 12(1)-12(n) is used to show the one or more interactive customizable workspaces in one or more windows, although other types and amounts of information can be displayed in other manners. The display can include a computer or mobile communications device display screen, such as a CRT or LCD screen, although other types and numbers of displays could be used.

The interface system in each of the user computing systems 12(1)-12(n) is used to operatively couple and communicate between each of the user computing systems 12(1)-12(n) and each of the information provider systems 14(1)-14(n) along with the workspace management processing system 16 via the communications network 18, although other types and numbers of communication networks or systems with other types and numbers of connections and configurations can be used. By way of example only, the communication network can use TCP/IP over Ethernet and industry-standard protocols, including SOAP, XML, LDAP, and SNMP, although other types and numbers of communication networks, such as a direct connection, a local area network, a wide area network, modems and phone lines, e-mail, and wireless communication technology, each having their own communications protocols, can be used.

Each of the information provider systems 14(1)-14(n) provides by way of example financial information objects, event/news information objects, product information objects, and/or personal information objects, although other numbers and types of systems and other numbers and types of information, such as sports information, can be provided. Information is represented in the form of information objects that can be manipulated on and between workspaces, although the information can be in other formats. Each of the information provider systems 14(1)-14(n) includes a central processing unit (CPU) or processor, a memory, and an interface system which are coupled together by a bus or other link, although other numbers and types of components, parts, devices, systems, and elements in other configurations and locations can be used. The processor in each of the information provider systems 14(1)-14(n) executes a program of stored instructions for one or more aspects of the present invention as described and illustrated by way of the embodiments herein, although the processor could execute other numbers and types of programmed instructions.

The memory in each of the information provider systems 14(1)-14(n) stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in each of the information provider systems 14(1)-14(n).

The interface system in each of the information provider systems 14(1)-14(n) is used to operatively couple and communicate between each of the information provider systems 14(1)-14(n) and each of the user computing systems 12(1)-12(n) along with the workspace management processing system 16 via the communications network, although other types and numbers of communication networks or systems with other types and numbers of connections and configurations can be used.

The workspace management processing system 16 generates and provides at least one multiple customized interactive workspaces based on a stored default interactive workspace populated with selected information objects and selected application tools, although the customized interactive workspace can provide other types and numbers of functions and other numbers and types and numbers of processing systems can be used.

The workspace management processing system 16 includes a central processing unit (CPU) or processor, a memory, and an interface system which are coupled together by a bus or other link, although other numbers and types of components, parts, devices, systems, and elements in other configurations and locations can be used. The processor in the workspace management processing system 16 executes a program of stored instructions for one or more aspects of the present invention as described and illustrated by way of the embodiments herein, although the processor could execute other numbers and types of programmed instructions.

The memory in the workspace management processing system 16 stores these programmed instructions for one or more aspects of the present invention as described and illustrated herein, although some or all of the programmed instructions could be stored and/or executed elsewhere. A variety of different types of memory storage devices, such as a random access memory (RAM) or a read only memory (ROM) in the system or a floppy disk, hard disk, CD ROM, DVD ROM, or other computer readable medium which is read from and/or written to by a magnetic, optical, or other reading and/or writing system that is coupled to the processor, can be used for the memory in the workspace management processing system 16.

The interface system in the workspace management processing system 16 is used to operatively couple and communicate between the workspace management processing system 16 and each of the user computing systems 12(1)-12(n) along with each of the information provider systems 14(1)-14(n) via the communications network 18, although other types and numbers of communication networks or systems with other types and numbers of connections and configurations can be used.

Although embodiments of the user computing systems 12(1)-12(n), information provider systems 14(1)-14(n), and the workspace management processing system 16 are described herein, each of these systems can be adapted to and implemented on any suitable computer system or computing device. It is to be understood that the devices and systems of the embodiments described herein are for exemplary purposes, as many variations of the specific hardware and software used to implement the embodiments are possible, as will be appreciated by those skilled in the relevant art(s).

Furthermore, each of the systems of the embodiments may be conveniently adapted and implemented using one or more general purpose computer systems, microprocessors, digital signal processors, and microcontrollers, programmed according to the teachings of the embodiments, as described and illustrated herein, and as will be appreciated by those ordinarily skilled in the art.

In addition, two or more computing systems or devices can be substituted for any one of the systems in any embodiment of the embodiments. Accordingly, principles and advantages of distributed processing, such as redundancy and replication also can be implemented, as desired, to increase the robustness and performance of the devices and systems of the embodiments. The embodiments may also be implemented on computer system or systems that extend across any suitable network using any suitable interface mechanisms and communications technologies, including by way of example only telecommunications in any suitable form (e.g., voice and modem), wireless communications media, wireless communications networks, cellular communications networks, G3 communications networks, Public Switched Telephone Network (PSTNs), Packet Data Networks (PDNs), the Internet, intranets, and combinations thereof.

The embodiments may also be embodied as a computer readable medium having instructions stored thereon for one or more aspects of the present invention as described and illustrated by way of the embodiments herein, as described herein, which when executed by a processor, cause the processor to carry out the steps necessary to implement the methods of the embodiments, as described and illustrated herein.

Figure 2:
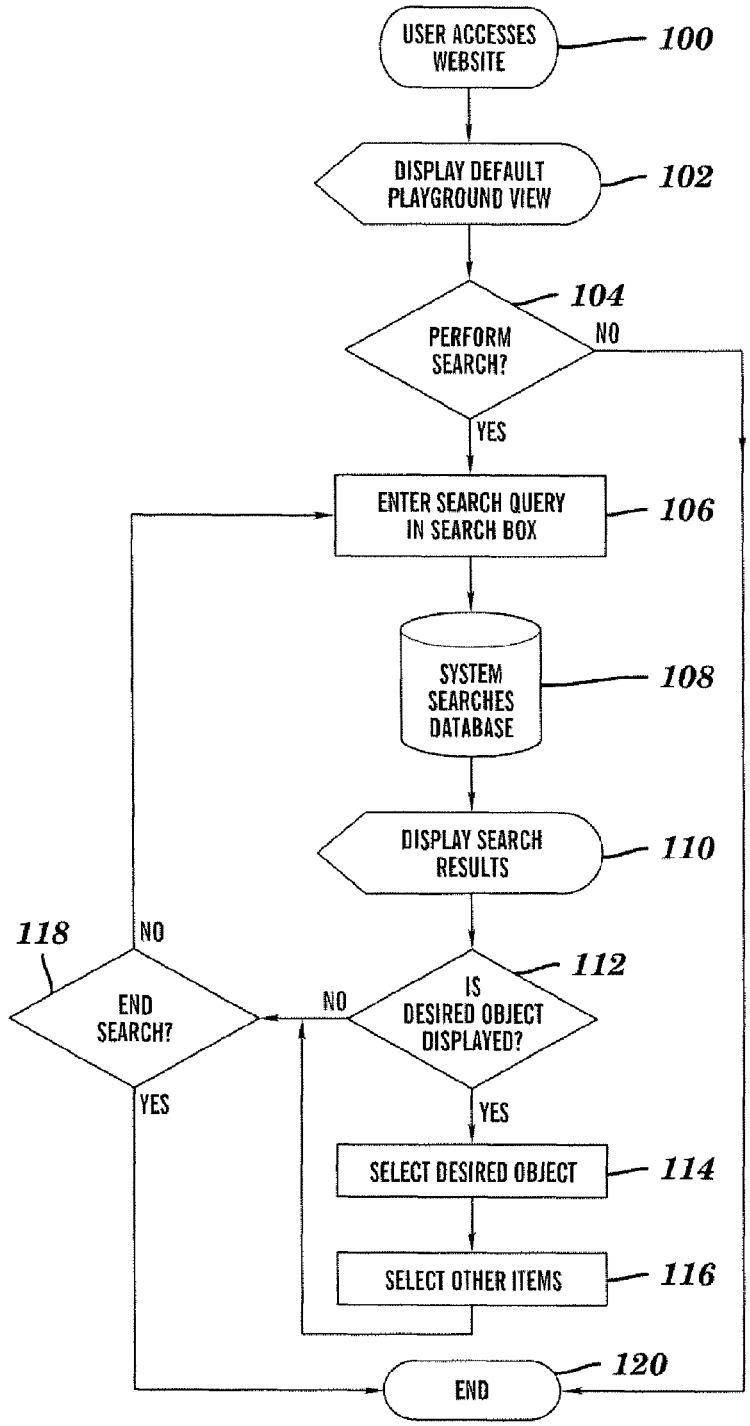
FIG. 2 is a flow chart of a method for generating a customized interactive workspace (the "playground") in a video game display format for interacting with and manipulating information in accordance with embodiments of the present invention.

A method for generating a customized interactive workspace in a video game display graphical user interface format for interacting with information in accordance with embodiments of the present invention will now be described below with reference to FIGS. 1-6. Referring more specifically to FIG. 2, in step 100 an operator at one of the user computing systems 12(1)-12(n) logs into the workspace management processing system 16 to access a workspace, although other manners for accessing a workspace can be used. If this is the first time an operator at one of the user computing systems 12(1)-12(n) or if the operator has either not registered or completed registering before, the workspace management processing system 16 prompts the operator through the one of the user computing systems 12(1)-12(n) to enter profile information as set forth in FIG. 4. In these embodiments, the profile information entered and stored in memory in the workspace management system 16 includes, but not limited to, personal user information such as name, address, email address, phone number, and categories of information which are of interest, although other types and amounts of information can be obtained and/or entered and stored and this captured user profile data can be stored at other locations.

Figure 3:
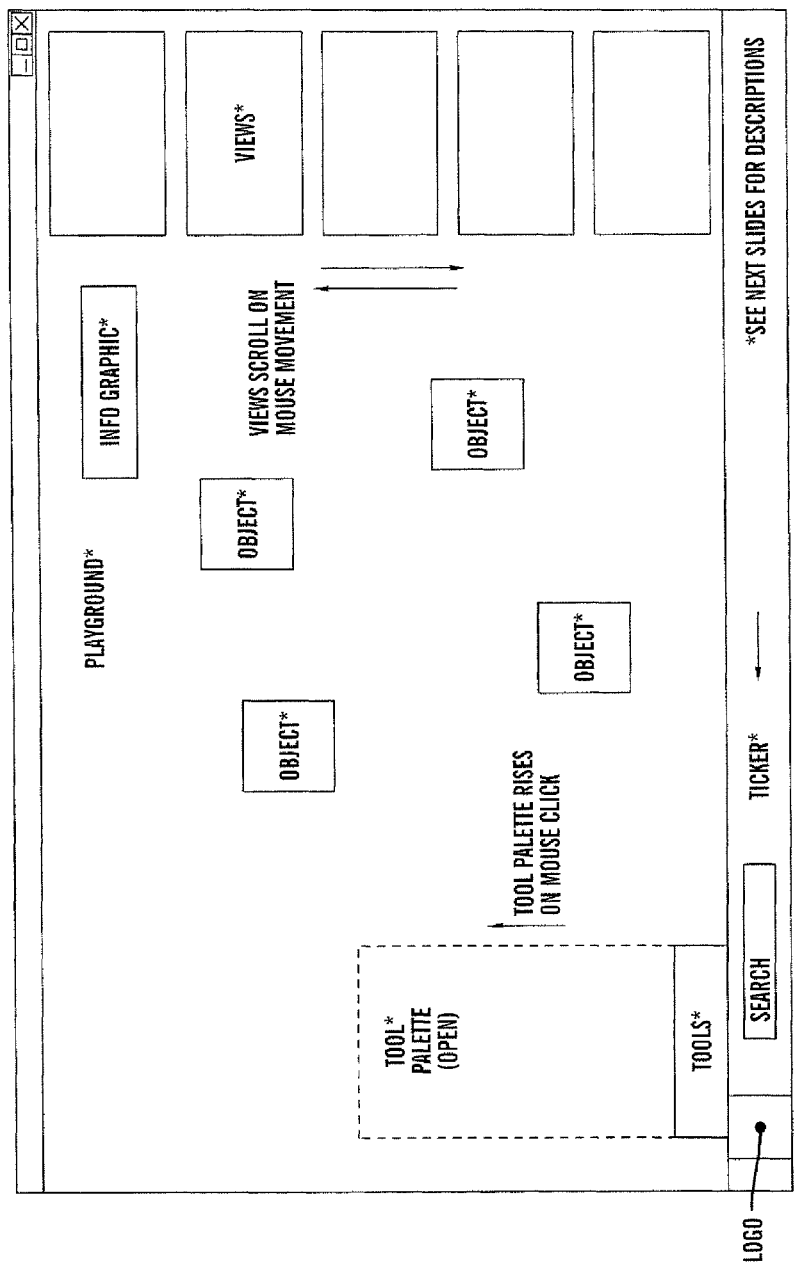
FIG. 3 is a block diagram of an exemplary default or initial workspace.

In step 102, the workspace management system 16 initially provides a default interactive workspace to the requesting one of the user computing systems 12(1)-12(n), although other types and numbers of workspaces could be provided, such as one or more previously stored customized interactive workspaces associated with the one of the user computing systems 12(1)-12(n). By way of example, a default interactive workspace is illustrated in FIG. 3.

Figure 5:
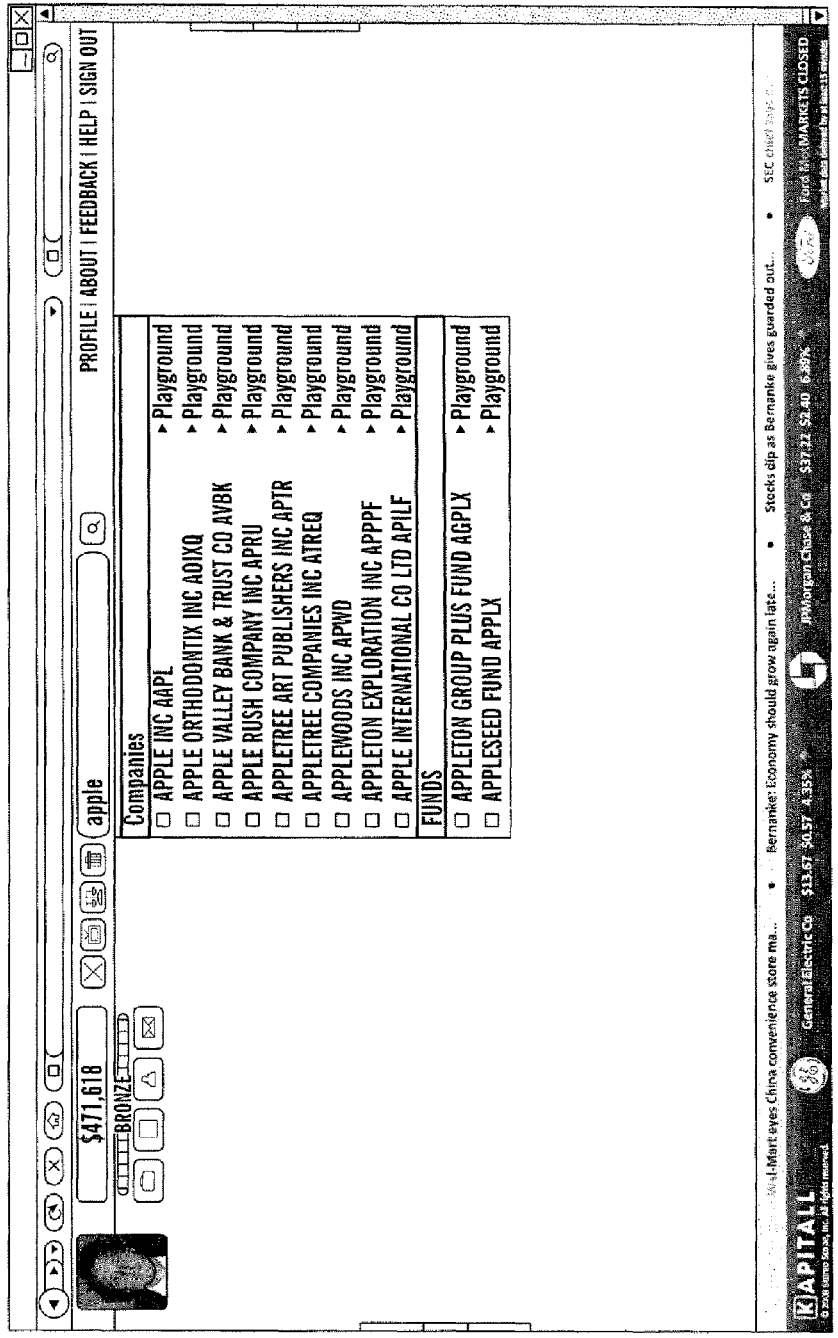
FIG. 5 is a screen shot of searching for information objects from an exemplary customized interactive workspace.

In step 104, the workspace management system 16 determines whether the requesting one of the user computing systems 12(1)-12(n) would like to search for one or more condensed information objects to select for inclusion in the default interactive workspace. If in step 104 the workspace management system 16 determines the requesting one of the user computing systems 12(1)-12(n) would not like to search for one or more condensed information objects to select for inclusion in the default interactive workspace, then the No branch is taken to step 120 where this method ends. By way of example only, the No branch may be taken when the requesting one of the user computing systems 12(1)-12(n) already has a customized interactive interface stored or does not desired to generate one at this time. If in step 104 the workspace management system 16 determines the requesting one of the user computing systems 12(1)-12(n) would like to search for one or more condensed information objects to select for inclusion in the default interactive workspace, then the Yes branch is taken to step 106. In step 106, the requesting one of the user computing systems 12(1)-12(n) enters one or more search queries for information objects which are transmitted to the workspace management processing system 16 to execute the search as illustrated in FIG. 5, although the requesting one of the user computing systems 12(1)-12(n) or other types and numbers of systems and devices could conduct the search.

In step 108, the workspace management processing system 16 receives and executes the one or more search queries in databases at one or more of the information provider systems 14(1)-14(n), although the workspace management processing system 16 could search other types and numbers of databases and other systems and devices, such as within its own memory 22. The workspace management processing system 16 obtains the results of these searches and condenses each of the results into one or more condensed information objects as illustrated in the list of search results for "apple" shown in FIG. 5, although the information objects can be obtained in other manners, such as by retrieving them from memory if previously generated. As discussed in greater detail earlier, an information object comprises a computer interface element that is a visual front to the underlying data that it represents and encapsulates. The information object visually represents the information or other data as an independent user interface component that displays a basic characteristic, such as an attribute-like name, of the information it encapsulates.

Figure 6:
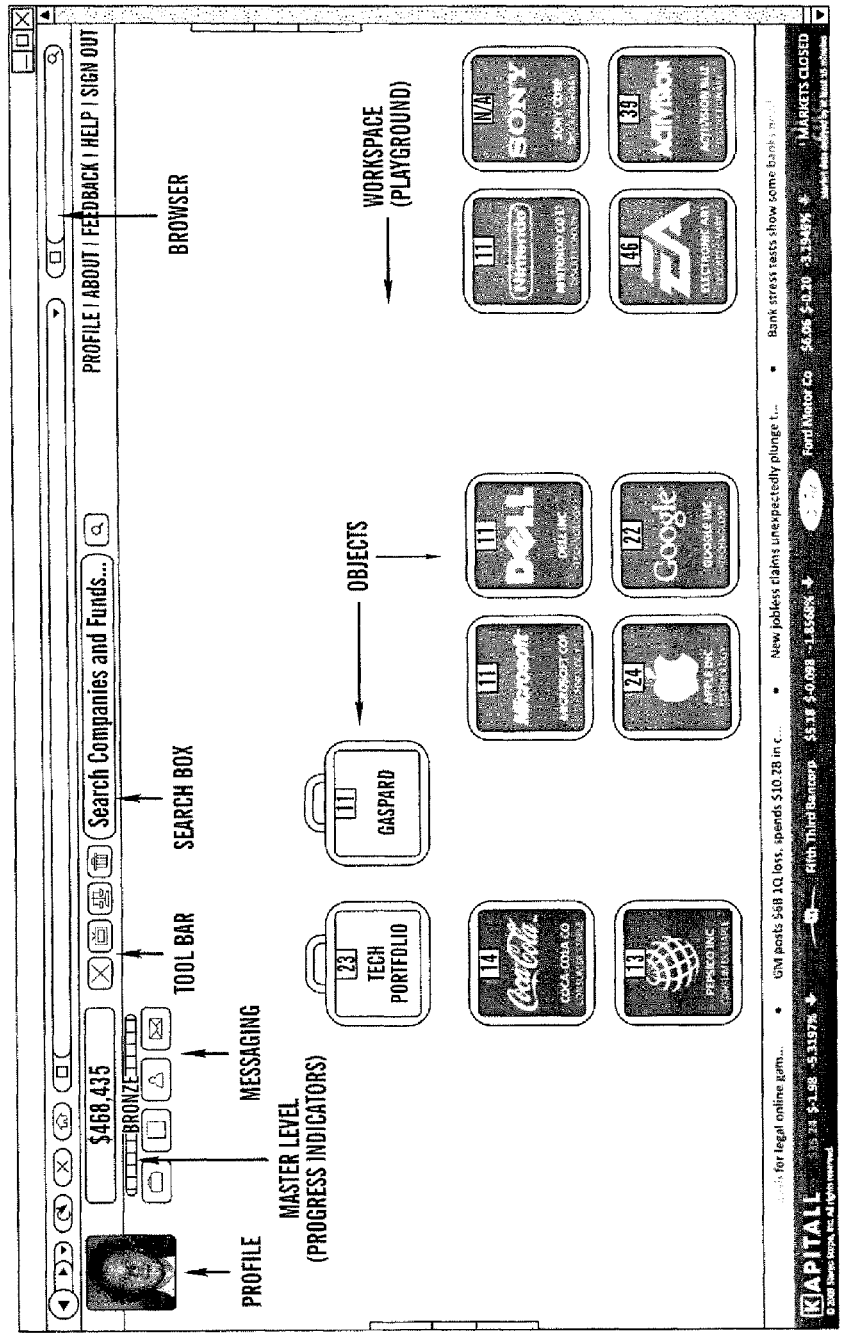
FIG. 6 is a screen shot of an exemplary customized interactive workspace populated with information objects.

In step 110, the workspace management processing system 16 generates and displays the one or more information objects resulting from the search in the customized interactive workspace in a video game display format on the display screen of the requesting one of the user computing systems 12(1)-12(n). By way of example only, a screen shot of a customized interactive workspace with information objects loaded in and entitled: "TECH PORTFOLIO"; "GASPARD"; "COCA-COLA"; "PEPSICO INC"; "MICROSOFT"; "DELL"; "APPLE"; "GOOGLE"; "NINTENDO"; "SONY"; "ELECTRONIC ARTS" and "ACTIVISION" is illustrated in FIG. 6, although other types and numbers of information objects and other interactive headers could be populated into the customized interactive workspace.

In step 112, the workspace management processing system 16 queries the requesting one of the user computing systems 12(1)-12(n) to determine whether the desired information objects, in this particular example company related information objects, are displayed on the customized interactive workspace. If in step 112 the workspace management processing system 16 determines the desired information objects, in this particular example company related information objects, are not displayed, then the No branch is taken to step 118.

In step 118, the workspace management processing system 16 queries the requesting one of the user computing systems 12(1)-12(n) to determine whether to end any further searching. If in step 118 the workspace management processing system 16 determines the requesting one of the user computing systems 12(1)-12(n) would not like to end the search, then the No branch is taken back to step 106 as described earlier. If in step 118 the workspace management processing system 16 determines the requesting one of the user computing systems 12(1)-12(n) would like to end the search, then the Yes branch is taken back to step 120 where this process ends.

If back in step 112 the workspace management processing system 16 determines the desired information objects, in this particular example company related information objects, are now all displayed, then the Yes branch is taken to step 114. In step 114, the workspace management system 16 provides the requesting one of the user computing systems 12(1)-12(n) options for other items, such as application tools, feature operations, real time communication systems, stock tickers, time zone clocks, training session engagement icons, and training mastery level indicators, by way of example only, although other types and numbers of items can be provided for selection and can be obtained and presented in other manners. The workspace management system 16 receives the selection of any of these items from the requesting one of the user computing systems 12(1)-12(n) and then generates displays any selected items in the customized interactive workspace in a video game display format on the display screen of the requesting one of the user computing systems 12(1)-12(n). By way of example only, a screen shot of a customized interactive workspace with: "PROFILE"; "MASTER LEVEL"; "TOOL BAR"; "SEARCH BOX": "BROWSER"; AND INFORMATION OBJECTS" is illustrated in FIG. 6, although other types and numbers of items could be entered. Next, the method proceeds again to step 118 as described in greater detail earlier.

Figure 7:
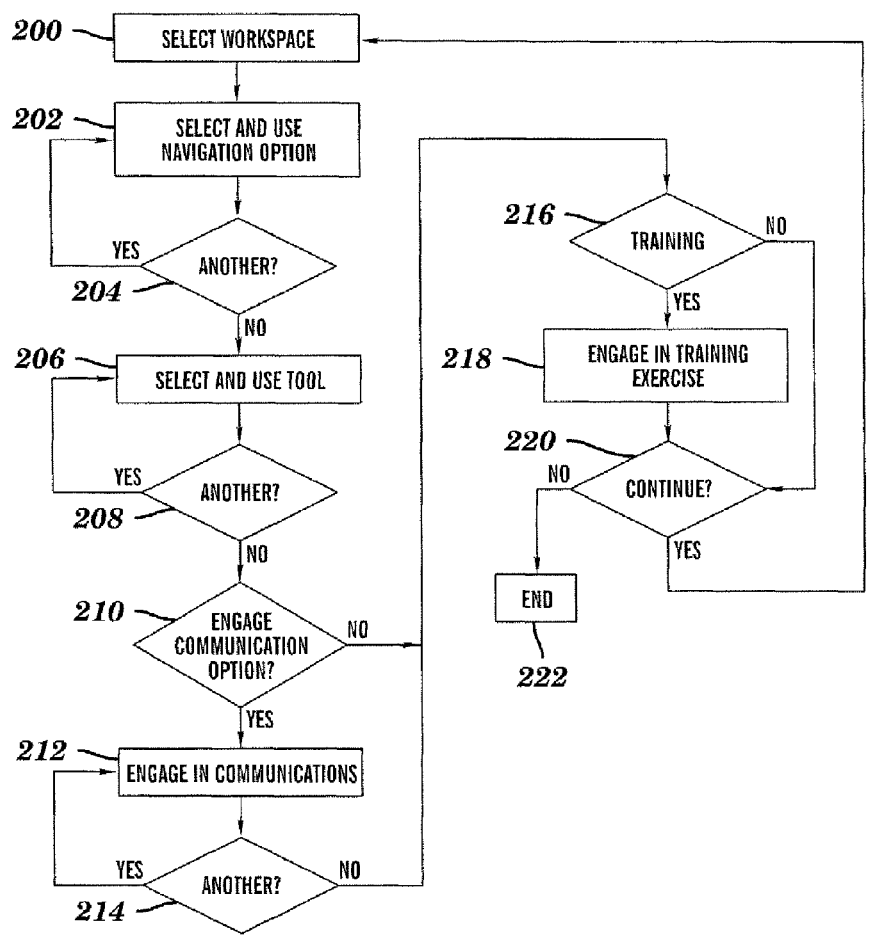
FIG. 7 is a flow chart of a method for interacting with information in a customized interactive workspace in a video game display format accordance with embodiments of the present invention.

A method for interacting with information in a customized interactive workspace in a video game display graphical user interface format accordance with embodiments of the present invention will now be described below with reference to FIGS. 1 and 7-16. Referring more specifically to FIG. 7, in step 200 the workspace management processing system 16 provides the requesting one of the user computing systems 12(1)-12(n) with one or more options of previously generated customized interactive workspaces associated with and stored for the requesting one of the user computing systems 12(1)-12(n), although the customized interactive workspace could be stored at another location or can be newly generated each time. The workspace management processing system 16 receives the request to either provide one of the stored customized interactive workspaces or to generate one by condensing and organizing search results as described earlier and provides this for display on a display system at the requesting one of the user computing systems 12(1)-12(n).

Figure 9:
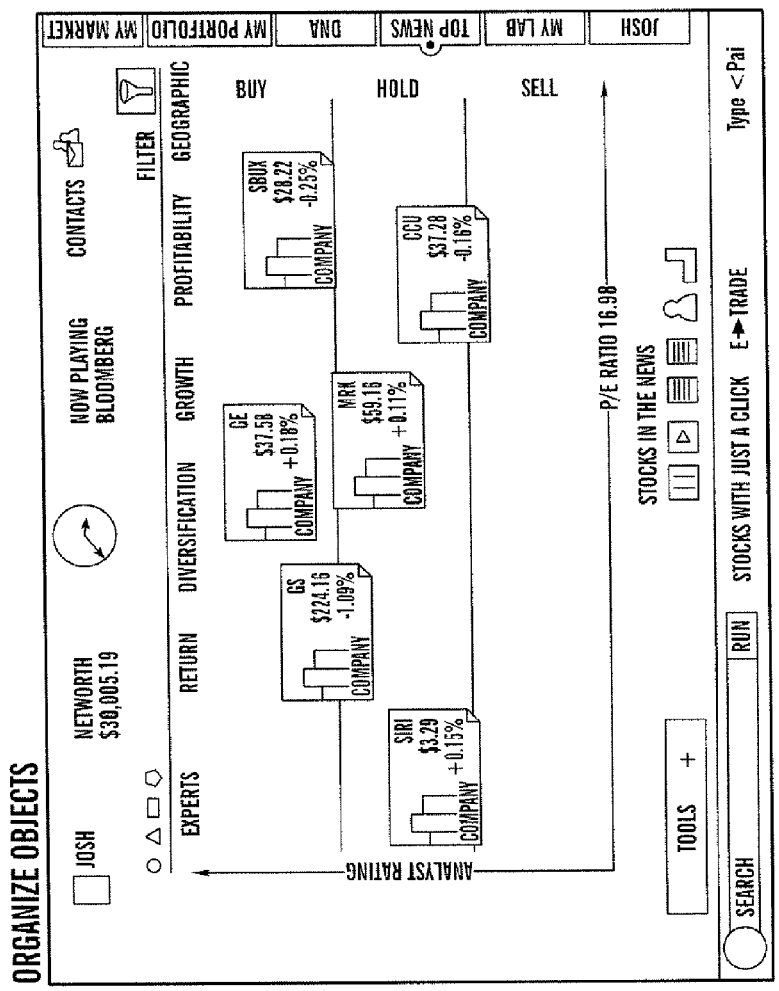
FIG. 9 is a screen shot of organizing information objects in the exemplary customized interactive workspace.
Figure 10A:
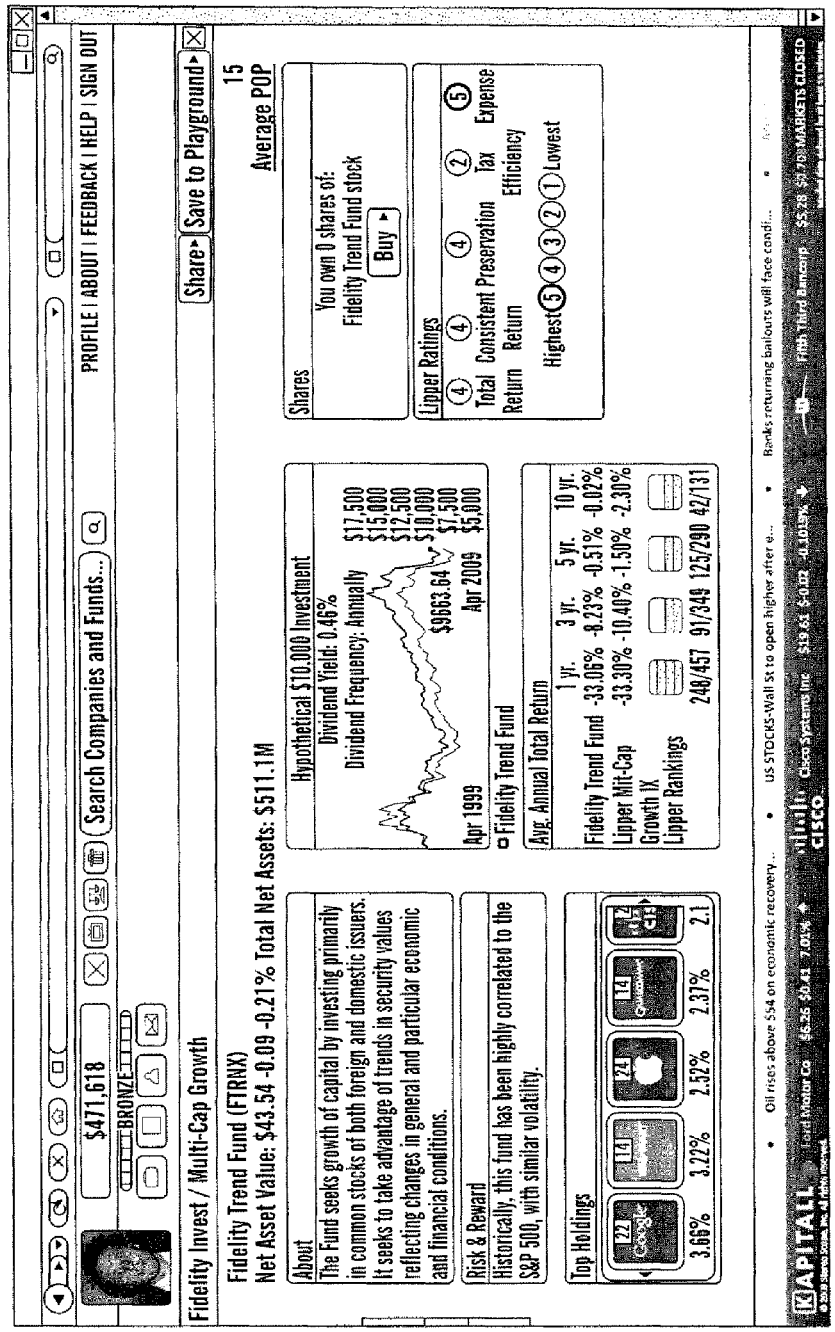
Figure 10B:
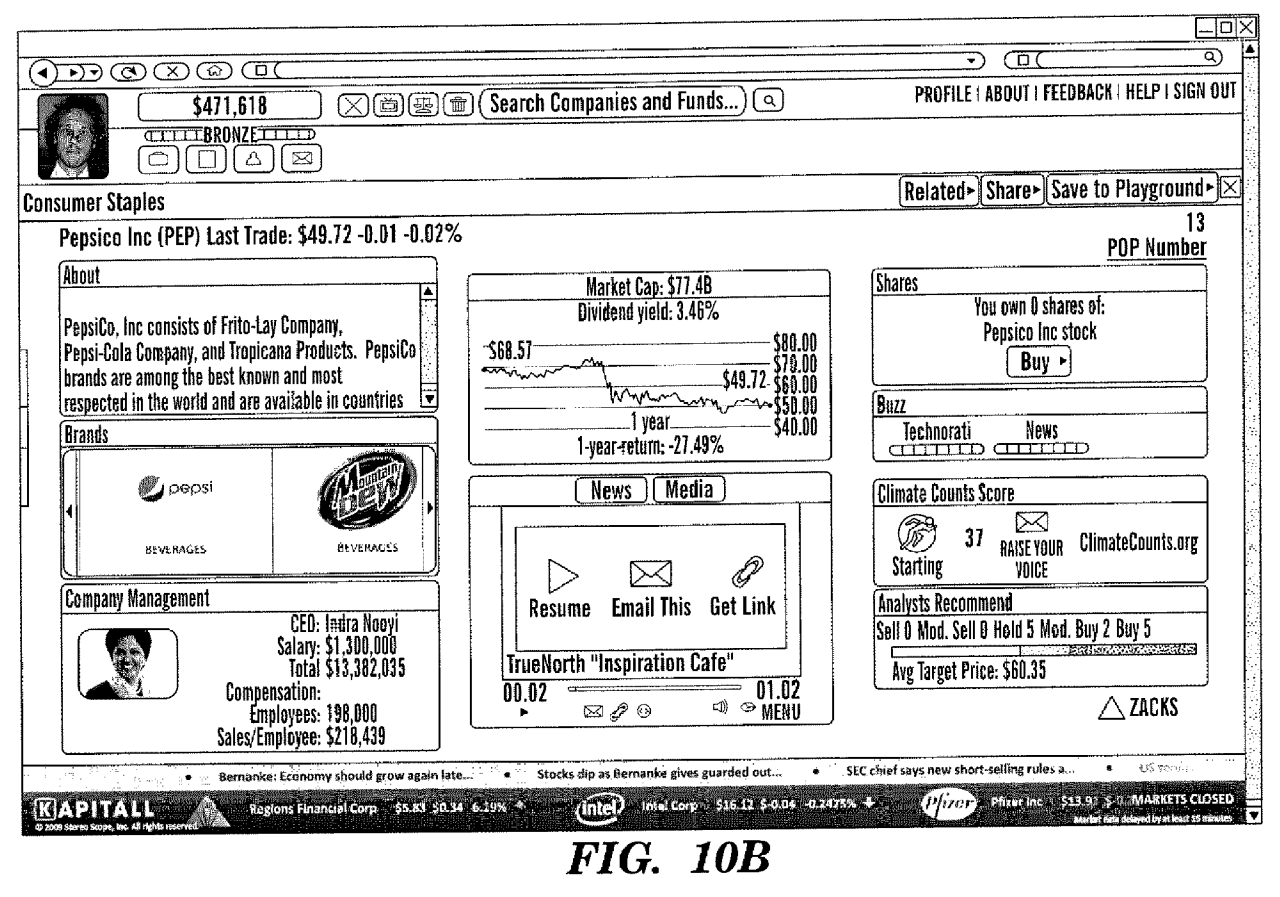
Figure 11:
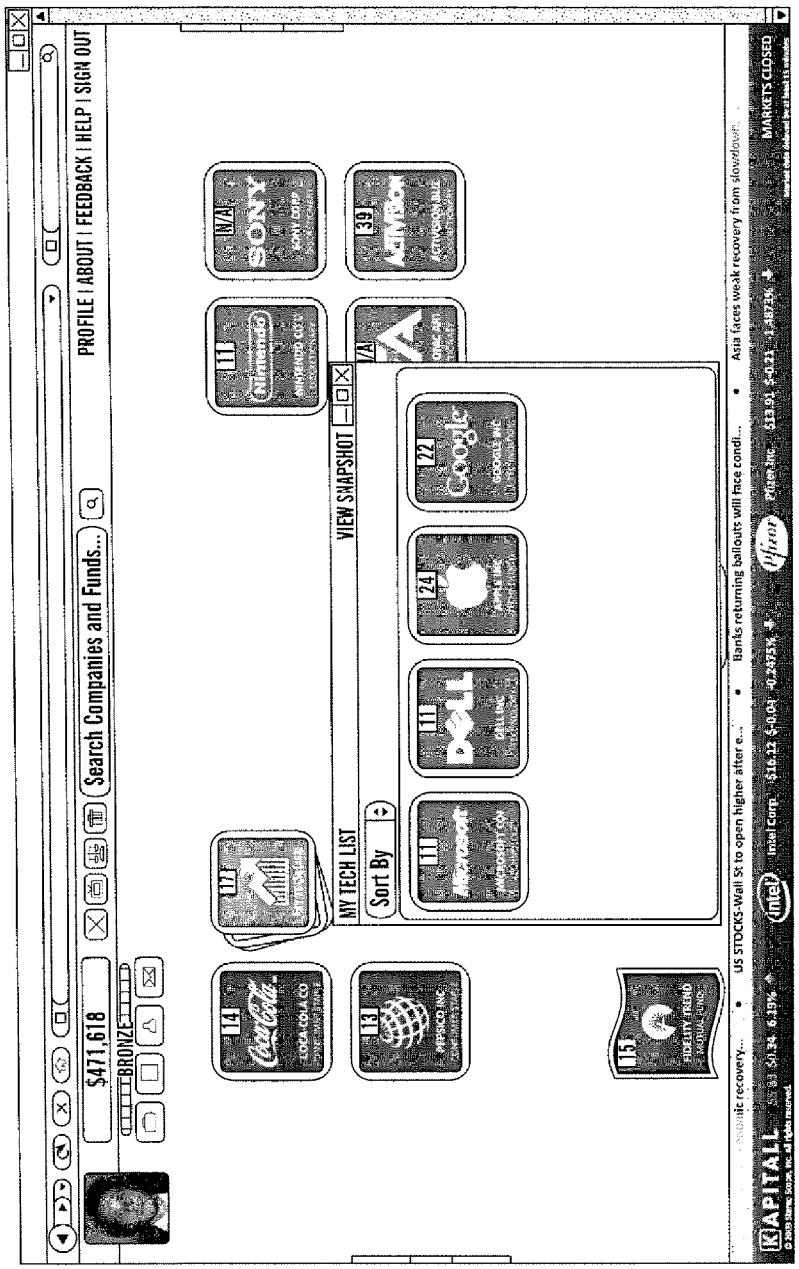
FIG. 11 is a screen shot of grouping information objects together into lists in the exemplary customized interactive workspace.
Figure 12:
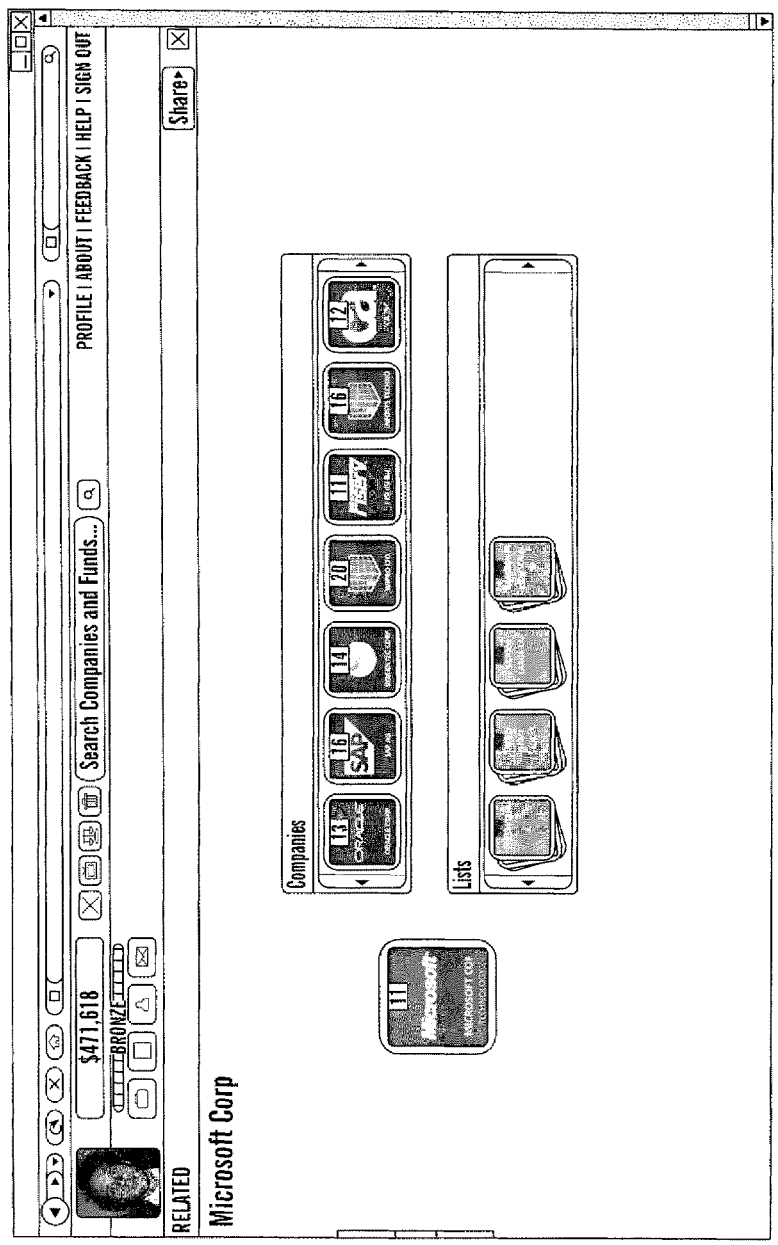
FIG. 12 is a screen shot of browsing related information objects in the exemplary customized interactive workspace.
Figure 13:
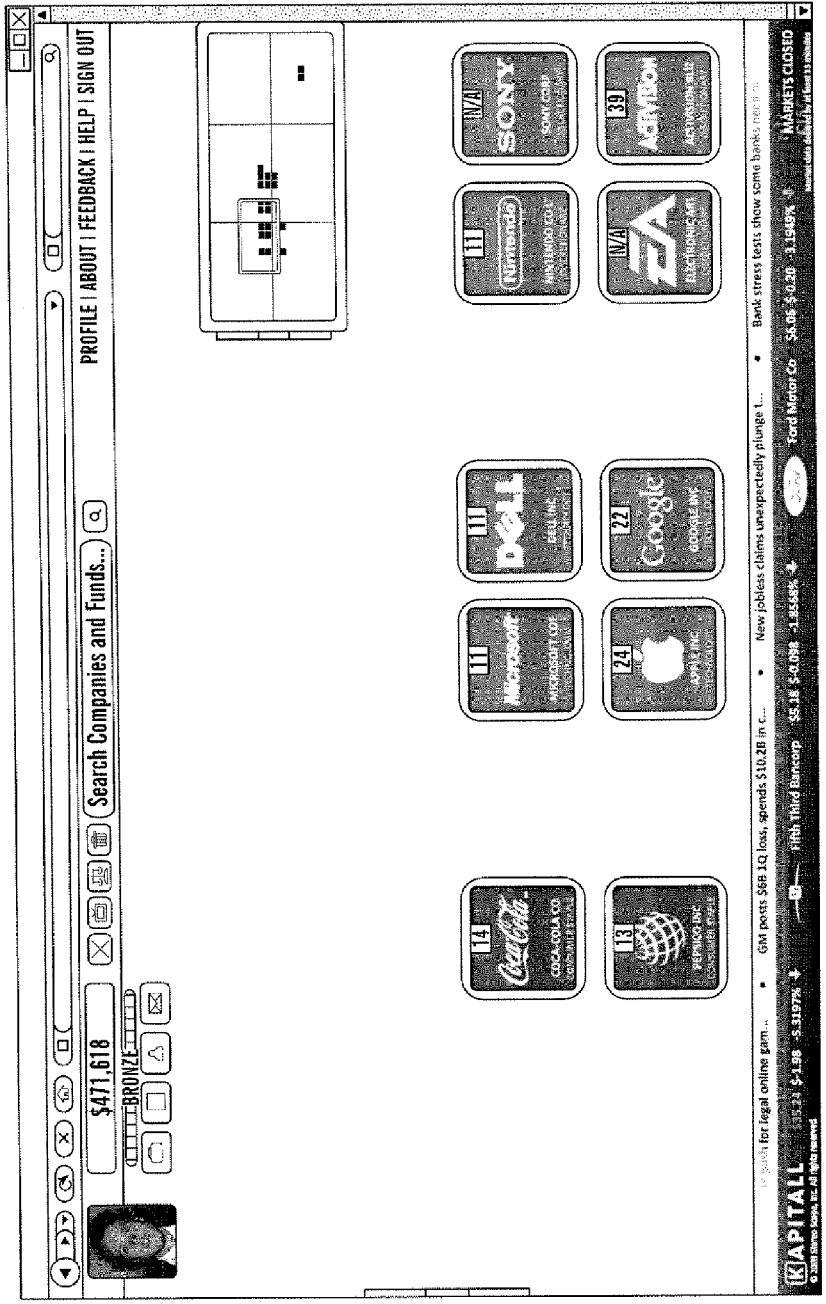
FIG. 13 is a screen shot of navigating the exemplary customized interactive workspace using a navigation map.

In step 202, the workspace management processing system 16 receives, processes and displays the results of the requesting one of the user computing systems 12(1)-12(n) selecting and using one or more actions or feature operations on the customized interactive interface, although the action and feature operation can be executed by other systems, such as the requesting one of the user computing systems 12(1)-12(n). By way of example only, the workspace management processing system 16 could receive, process and display the result of an action in the exemplary customized interactive workspace to: move and select information objects as illustrated in FIG. 8; organize information objects as illustrated in FIG. 9; and enter or open information objects as illustrated in FIGS. 10A and 10B; group information objects together into lists as illustrated in FIG. 11; browse related information objects as illustrated in FIG. 12; and navigate the exemplary customized interactive workspace using a navigation map as illustrated in FIG. 13, although other numbers and types of action or feature operations, such as changing graphics or fonts by way of example only, could be executed.

Figure 8:
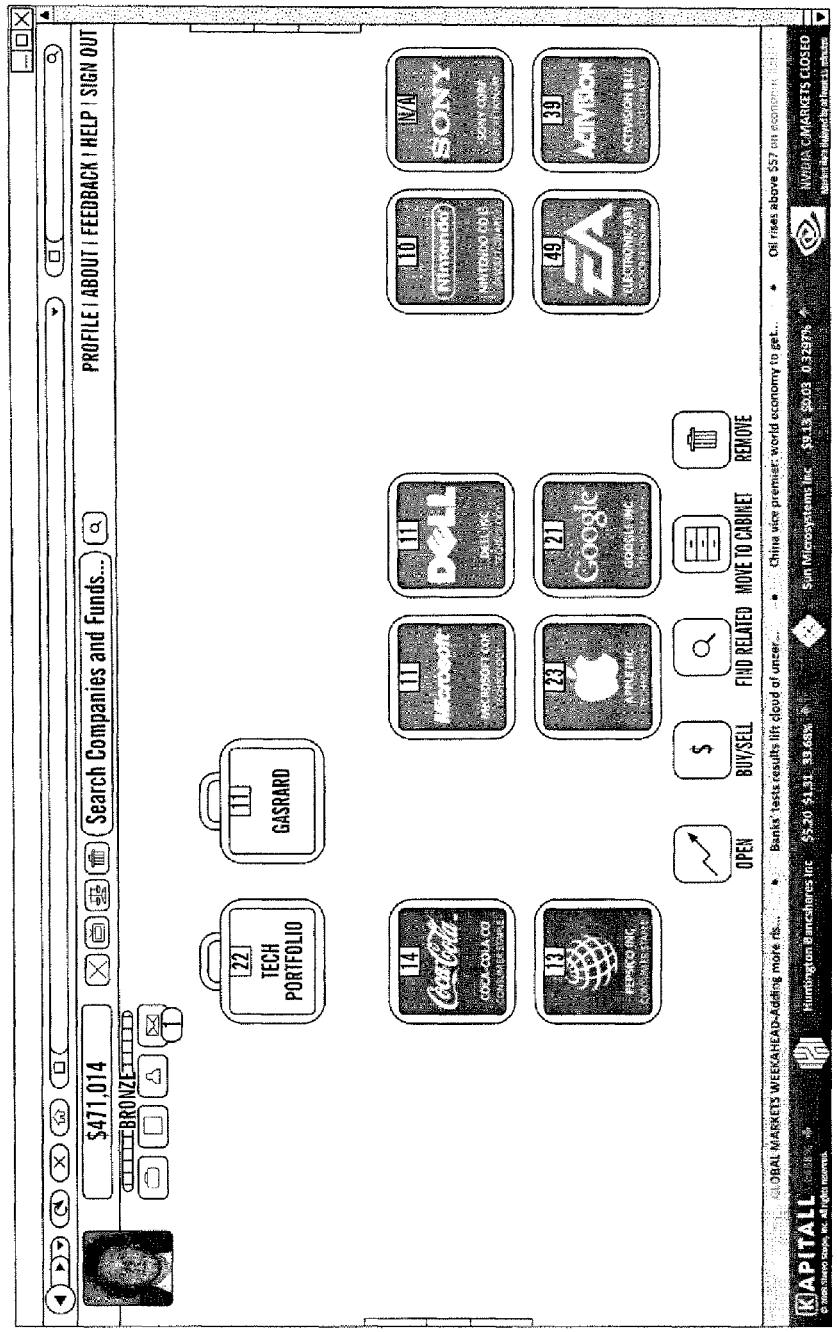
FIG. 8 is a screen shot of moving and selecting information objects in the exemplary customized interactive workspace.

Moving and selecting information objects in the exemplary customized interactive workspace as illustrated in FIG. 8 allows an operator at one of the user computing systems 12(1)-12(n) to easily manipulate and interact with any of the displayed information objects. Organizing the information objects in the exemplary customized interactive workspace as illustrated in FIG. 9 allows an operator at one of the user computing systems 12(1)-12(n) to organize the information objects in whatever format is most beneficial to the operator for the particular operation being carried out. By way of example only, an operator at one of the user computing systems 12(1)-12(n) may open several interactive customized workspaces with different sets of information objects, such as different investment technology sectors, which are organized in similar manners to facilitate comprehension while navigation between workspaces. Entering or otherwise opening information objects in the exemplary customized interactive workspace as illustrated in FIGS. 10A and 10B allows an operator at one of the user computing systems 12(1)-12(n) to see more detailed information stored under each of the opened condensed information objects. Grouping information objects together into lists as illustrated in FIG. 11 allows an operator at one of the user computing systems 12(1)-12(n) to arrange the information objects into subsets for further review, comparison and analysis. Browsing related information objects as illustrated in FIG. 12 allows an operator at one of the user computing systems 12(1)-12(n) to identify other related information objects to a selected information object for further review, comparison and analysis. In these embodiments, the workspace management processing system 16 searches for and identifies related information objects to a selected information object based on one or more entered search terms, although related information objects can be identified in other manners. By way of example only, the operator at one of the user computing systems 12(1)-12(n) may wish to compare the "MICROSOFT" information object to other related technology companies and lists as illustrated in FIG. 12. Navigating the exemplary customized interactive workspace using an overlaid navigation map as illustrated in FIG. 13 allows an operator at one of the user computing systems 12(1)-12(n) to utilize the miniaturized navigation map in the right hand corner to more easily navigate the interactive customized workspace. In these embodiments, the navigation map illustrates a smaller map which divides the interactive customized workspace into six quadrants which can each be individually selected and enlarged for display and interaction, although the navigation map divide up the customized interactive workspace into other numbers and types of sections and can provide other types of navigation.

In step 204, once an action or feature operation has been executed, the workspace management processing system 16 determines whether the requesting one of the user computing systems 12(1)-12(n) would like to select and use another action or feature operation in the customized interactive workspace. If in step 204 the workspace management processing system 16 determines the requesting one of the user computing systems 12(1)-12(n) would like to select and use another action or feature operation in the customized interactive workspace, then the Yes branch is taken back to step 202 as described earlier. If in step 204 the workspace management processing system 16 determines the requesting one of the user computing systems 12(1)-12(n) would not like to select and use another action or feature operation in the customized interactive workspace at this time, then the No branch is taken to step 206.

Figure 14:
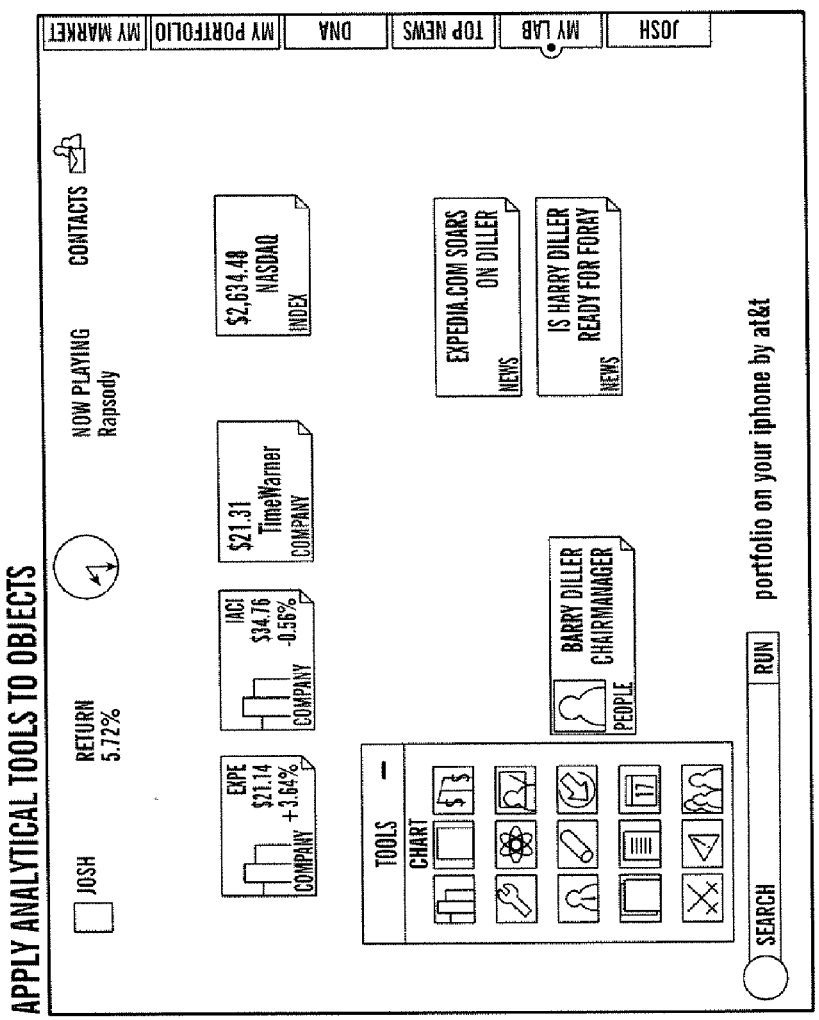
FIG. 14 is a screen shot of applying an analytic tool to an information object and displaying the results of this action in the exemplary customized interactive workspace.
Figure 15:
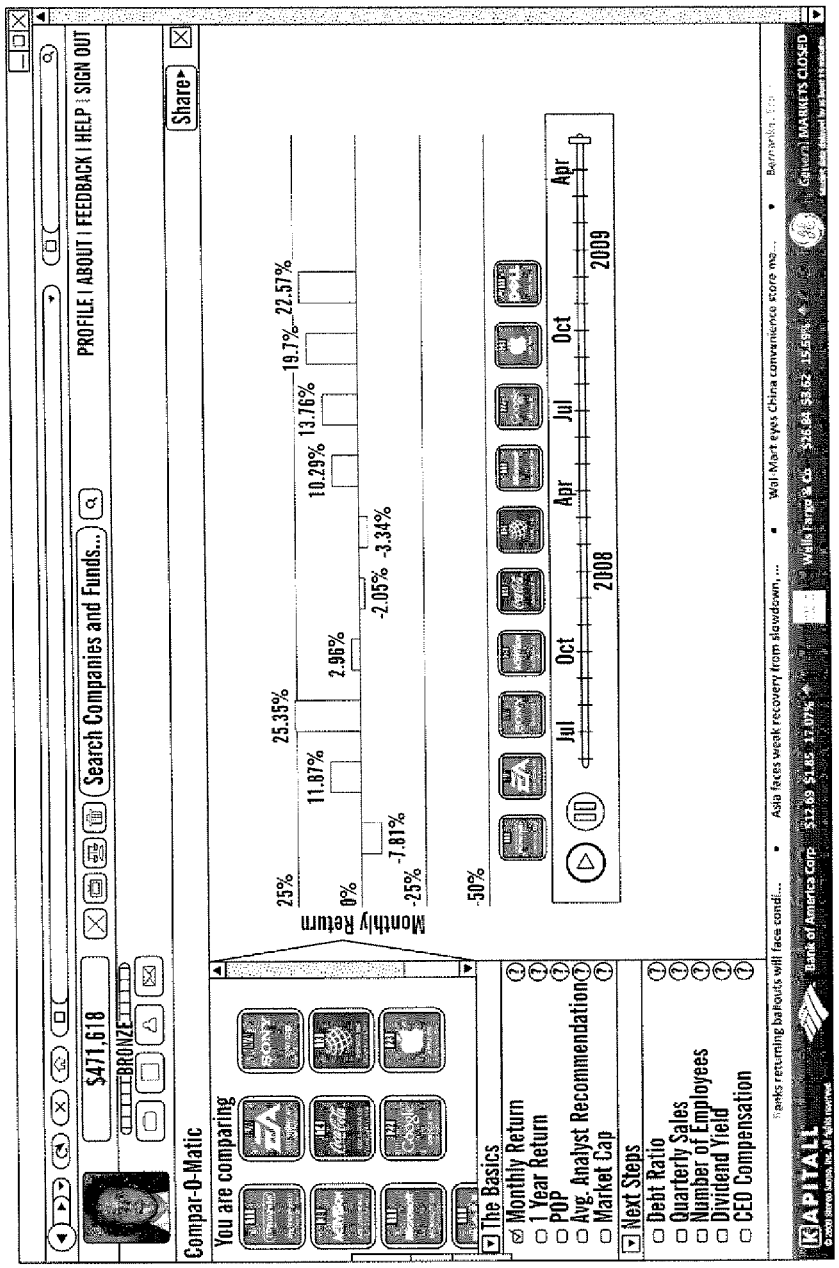
FIG. 15 is a screen shot of exemplary results of applying the analytic tool to an information object in the exemplary customized interactive workspace.

In step 206, the workspace management processing system 16 receives, processes and displays the results of the requesting one of the user computing systems 12(1)-12(n) selecting and using one or more application tools on one or more information objects in the customized interactive interface. By way of example only, the workspace management processing system 16 could receive, process and display the result of an action to select and apply an application tool to one or more of the information objects as illustrated in FIGS. 14 and 15, although other numbers and types of action or feature operations, such as changing graphics or fonts by way of example only, could be executed. Additionally, the workspace management processing system 16 could provide the requesting one of the user computing system 12(1)-12(n) with the option of having the result of the action displayed as an information overlay, although the result could be provided in the customized interactive workspace in other manners.

In step 208, once an application tool has been executed, the workspace management processing system 16 determines whether the requesting one of the user computing systems 12(1)-12(n) would like to select and utilize another application tool in the customized interactive workspace. If in step 204 the workspace management processing system 16 determines the requesting one of the user computing systems 12(1)-12(n) would like to select and use another analytic tool in the customized interactive workspace, then the Yes branch is taken back to step 206 as described earlier. If in step 208 the workspace management processing system 16 determines the requesting one of the user computing systems 12(1)-12(n) would not like to select and use another application tool in the customized interactive workspace at this time, then the No branch is taken to step 210.

In step 210, the workspace management processing system 16 determines whether the requesting one of the user computing systems 12(1)-12(n) would like to engage and utilize the real time communication option in the customized interactive workspace, although other types and numbers of communication systems which are engaged in other manners can be used. If in step 210 the workspace management processing system 16 determines the requesting one of the user computing systems 12(1)-12(n) would not like to engage and utilize the communication option in the customized interactive workspace, then the No branch is taken back to step 216. If in step 210 the workspace management processing system 16 determines the requesting one of the user computing systems 12(1)-12(n) would like to engage and utilize the communication option in the customized interactive workspace, then the Yes branch is taken to step 212.

Figure 16:
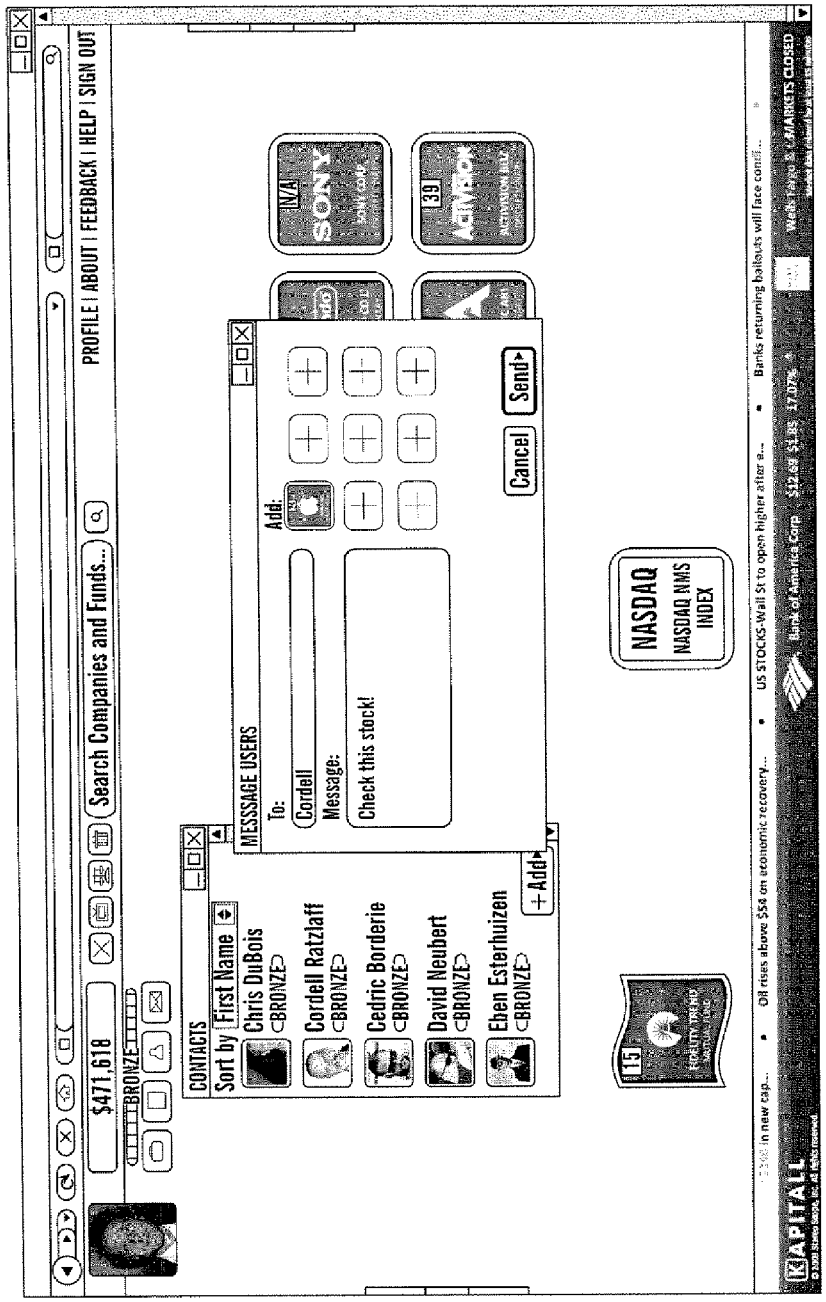
FIG. 16 is a screen shot of connecting with other user computing systems and sharing information objects with peers in the exemplary customized interactive workspace.

In step 212, the requesting one of the user computing systems 12(1)-12(n) engages in a real-time communication using the communication option on the customized interactive workspace. By way of example only, the workspace management processing system 16 could receive, process and display the result of the requesting one of the user computing systems 12(1)-12(n) engaging and utilizing an instant messaging system as illustrated in FIG. 16.

In step 214, once the communication has been completed, the workspace management processing system 16 determines whether the requesting one of the user computing systems 12(1)-12(n) would like to engage in another communication via the customized interactive workspace. If in step 214 the workspace management processing system 16 determines the requesting one of the user computing systems 12(1)-12(n) would like to engage in another communication via the customized interactive workspace, then the Yes branch is taken back to step 212 as described earlier. If in step 214 the workspace management processing system 16 determines the requesting one of the user computing systems 12(1)-12(n) would not like to engage in another communication via the customized interactive workspace, then the No branch is taken to step 216.

In step 216, the workspace management processing system 16 determines whether the requesting one of the user computing systems 12(1)-12(n) would like to engage in training in the customized interactive workspace. If in step 216 the workspace management processing system 16 determines the requesting one of the user computing systems 12(1)-12(n) would not like to engage in training in the customized interactive workspace, then the No branch is taken to step 220. If in step 216 the workspace management processing system 16 determines the requesting one of the user computing systems 12(1)-12(n) would not like to engage in training in the customized interactive workspace, then the Yes branch is taken to step 218.

In step 218, the workspace management processing system 16 reviews the stored user profile and stored training result information and obtains and provides training materials to the requesting one of the user computing systems 12(1)-12(n) via the customized interactive workspace. The workspace management processing system 16 monitors the training and then optionally tests the requesting one of the user computing system 12(1)-12(n), although the testing can be conducted in other manners by other systems and devices. The results of the training are updated and stored by the workplace management processing system with the user profile currently associated with the requesting one of the user computing systems 12(1)-12(n), although the results can be stored in other manners and locations.

In step 220, the workspace management processing system 16 determines whether the requesting one of the user computing systems 12(1)-12(n) would like to continue using the customized interactive workspace. If in step 220 the workspace management processing system 16 determines the requesting one of the user computing systems 12(1)-12(n) would not like to engage using the customized interactive workspace, then the No branch is taken to step 222 where this session of the method ends. If in step 220 the workspace management processing system 16 determines the requesting one of the user computing systems 12(1)-12(n) would like to continue using the customized interactive workspace, then the Yes branch is taken to step 200 as described earlier.

In the above-described steps, once an action or feature operation has been executed, the workspace management processing system 16 optionally can update the associated user profile as a result of any information obtained as a result of the action or feature operation and can adjust the customized interactive workspace based on the update user profile information. By way of example only, if the action related to applying an application tool to determine an average rate of return, the workspace management processing system 16 could generate an item for the customized interactive interface which continually determined and displayed this rate of return.

Accordingly, as described and illustrated by the exemplary embodiments herein the present invention provides a more effective method, computer readable medium and system for interacting with for information in a customized interactive workspace configured in a video game display format. For example, with the present invention financial information, such as in-depth information on stocks and mutual funds, is much easier to understand, manipulate, and analyze from within one single, integrated system in a video game display format. Additionally, the present invention provides this interaction with this information in a much more intuitive and user friendly manner. As a result, with the present invention individuals are not only able to easily obtain and interact with the non-video game based information they need, but are motivated to do so because of the ease with which the present invention presents and makes this information visual and available to them. Further, the present invention provides a method for interacting with information that may include one or more of application tools that affect and act upon objects, user-directed controls, full screen graphics, instant or real-time communication with peer computing systems, information overlays, instant or real-time feedback, user profiles, displayed performance results measured against metrics, and a unique and user friendly graphical user interface.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing an interactive information system, the method comprising:

obtaining at a workspace management processing system a selection of a plurality of condensed information objects and a plurality of application tools, at least one of the condensed information objects visually representing at least one stream of information from an information provider system, the at least one stream of information including dynamically changing data;

providing at a computing system a customized interactive workspace for interacting with information in a video game display graphical user interface format from the workspace management processing system based on a default interactive customizable workspace populated with the selected plurality of condensed information objects and plurality of application tools, at least one of the condensed information objects varying visually according to the dynamically changing data from the at least one stream of information without requiring user input via the customized interactive workspace;

receiving, at the customized interactive workspace, a selection of at least one of the plurality of application tools and at least one of the plurality of condensed information objects, wherein in response to the selection, the at least one application tool interacts with the at least one condensed information object; and providing, at the customized interactive workspace, information determined from the interaction between the at least one application tool and the at least one condensed information object.

2. The method as set forth in claim 1 further comprising obtaining at the workspace management processing system results of a search for one or more condensed information objects for selection to add to the default interactive workspace.

3. The method as set forth in claim 2 wherein the search for the one or more condensed information objects is based on a selection of at least one of a plurality of information object categories.

4. The method as set forth in claim 1 further comprising:

obtaining and executing one of a plurality of actions on one of the plurality of condensed information objects at the workspace management processing system; and providing in the customized interactive workspace results of the executing the obtained one of the plurality of actions on the one of the plurality of condensed information objects.

5. The method as set forth in claim 4 wherein the plurality of actions at least comprise expanding at least one of the plurality of condensed information objects in the customized interactive workspace into a snapshot view, entering information into the snapshot view in the customized interactive workspace, spatially arranging the plurality of condensed information objects in the customized interactive workspace, or examining at least one of one or more lists from the at least one of the plurality of condensed information objects in the customized interactive workspace.

6. The method as set forth in claim 4 wherein the executing comprises engaging the real-time communication system for communications while remaining in the customized interactive workspace with the selected condensed information objects and the selected application tools.

7. The method as set forth in claim 1 wherein the providing the information comprises providing results of the interaction between the at least one application tool and the at least one condensed information object in an information overlay in the customized interactive workspace.

8. The method as set forth in claim 1 wherein the interaction between the at least one application tool and the at least one condensed information object determines, at the workspace management processing system, performance of at least one aspect of at least one of the plurality of condensed information objects, and providing, at the customized interactive workspace, information determined from the interaction comprises:
displaying at the computing system the determined performance in the at least one of the plurality of condensed information objects in the customized interactive workspace.

9. The method as set forth in claim 1 further comprising generating, saving and storing a user profile associated with the customized interactive workspace at the workspace management processing system based on provided user profile information.

10. The method as set forth in claim 9 further comprising:
monitoring at the workspace management processing system completion of one or more training exercises;
determining at the workspace management processing system an adjustment to the mastery level rating based on the monitored completion of the one or more training exercises; and
displaying the determined mastery level rating in the customized interactive workspace.

11. The method of claim 1, wherein the video game display graphical user interface format comprises:
displaying the selected plurality of condensed information objects populated in the customizable interactive workspace through the use of a plurality of graphical icons;
displaying a mastery level rating based on a stored user profile associated with the computing system.

12. The method as set forth in claim 11 comprising obtaining at the workspace management processing system the at least one stream of information based on the stored user profile associated with the computing system.

13. The method as set forth in claim 11 wherein further comprising obtaining at the workspace management processing system a selection of at least one real-time communication system and wherein the providing a customized interactive workspace further comprises providing the customized interactive workspace further based on the obtained selection of the at least one real-time communication system.

14. The method as set forth in claim 11 wherein the interaction between the at least one application tool and the at least one condensed information object determines, at the workspace management processing system, performance of at least one aspect of at least one of the plurality of condensed information objects in the customized interactive workspace which has been expanded into a snapshot view, and providing, at the customized interactive workspace, information determined from the interaction comprises:
displaying at the computing system the determined performance of the least one of the plurality of condensed information objects in the snapshot view in the customized interactive workspace.

15. The method as set forth in claim 11 further comprising resetting the customized interactive workspace to the default interactive workspace.

16. The method as set forth in claim 11 wherein the plurality of condensed information objects comprise at least one of financial information, event information, news information, product information or personal information.

17. The method as set forth in claim 11 further comprising:
monitoring one or more actions relating to the customized interactive workspace; and
supplementing the stored user profile at the workspace management processing system based on the one or more monitored actions.

18. The method as set forth in claim 17 further comprising adjusting at least one of one of the plurality of condensed information objects and at least one other displayed element in the customized interactive workspace at the workspace management processing system based on the supplemented stored user profile.

19. The method as set forth in claim 11 further comprising executing the completion of one or more investment transactions with the workspace management processing system utilizing one or more of the condensed information objects in the customized interactive workspace.

20. The method as set forth in claim 11 further comprising providing with the workspace management processing system a navigation map in the customized interactive workspace to navigate and interact with one or more sections of the customized interactive workspace.

21. The method as set forth in claim 11 further comprising allowing, via the at least one application tool, changes to how the information is displayed.

22. The method as set forth in claim 11 further comprising allowing, via the customized interactive workspace, manipulation of the displayed information.

23. The method as set forth in claim 11 further comprising receiving real time data associated with the plurality of condensed information objects from one or more information provider systems, wherein the displayed information includes the real time data.

24. The method as set forth in claim 11 further comprising receiving financial data associated with the plurality of condensed information objects from one or more information provider systems.

25. The method as set forth in claim 24 wherein the customized interactive workspace provides training with the financial data.

26. The method of claim 11, wherein the video game display graphical user interface format further comprises presenting one or more training exercises based on the mastery level rating.

27. The method of claim 26, wherein at least one training exercise is not presented until the mastery level rating reaches a predetermined level.

28. The method as set forth in claim 26 further comprising:
generating with the workspace management processing system at least one of the plurality of condensed information objects; and
providing the at least one of the plurality of generated condensed information objects for selection by the computing system to add to a default interactive workspace.

29. The method of claim 11, wherein at least one of the plurality of application tools is not available for selection until the mastery level rating reaches a predetermined level.

30. The method of claim 11, wherein at least one of the plurality of condensed information objects are only available for selection upon the mastery level rating exceeding a predetermined level.

31. The method as set forth in claim 11 further comprising:
monitoring one or more actions relating to the customized interactive workspace;
supplementing the stored user profile at the workspace management processing system based on the one or more monitored actions; and
updating the displayed mastery level rating based on the stored user profile.

32. The method of claim 1, wherein the selection of the plurality of application tools depends on the selected plurality of condensed information objects populated in the customizable interactive workspace, such that the selection of the plurality of application tools is contextual.

33. The method as set forth in claim 32 further comprising saving and storing the customized interactive workspace.

34. The method as set forth in claim 33 further comprising providing at the computing system one or more additional customized interactive workspaces.

35. An interactive information workspace provider system comprising:
a customization system at a workspace management processing system that obtains a selection of a plurality of application tools and a plurality of condensed information objects, at least one of the plurality of condensed information objects visually representing at least one stream of information from an information provider system, the at least one stream of information including dynamically changing data, wherein in response to the selection, at least one application tool interacts with at least one condensed information object; and
a workspace processing system at the workspace management processing system that provides at a computing system a customized interactive workspace for interacting with information in a video game display graphical user interface format based on a default interactive workspace populated with the selected plurality of condensed information objects and plurality of application tools, at least one of the plurality of condensed information objects varying visually according to the dynamically changing data from the at least one stream of information without requiring user input via the customized interactive workspace,
wherein the customized interactive workspace provides information determined from the interaction between the at least one application tool and the at least one condensed information object.

36. The system as set forth in claim 35 wherein the customization system obtains results of a search for one or more condensed information objects for selection to add to the default interactive workspace.

37. The system as set forth in claim 36 wherein the customization system obtains results of the search based on a selection of at least one of a plurality of information object categories.

38. The system as set forth in claim 35 wherein the plurality of actions at least comprise expanding at least one of the plurality of condensed information objects in the customized interactive workspace into a snapshot view, entering information into the snapshot view in the customized interactive workspace, spatially arranging the plurality of one condensed information objects in the customized interactive workspace, or examining lists from the at least one of the plurality of condensed information objects in the customized interactive workspace.

39. The system as set forth in claim 35 wherein the workspace processing system provides the results in an information overlay in the customized interactive workspace.

40. The system as set forth in claim 35 wherein the interaction between the at least one application tool and the at least one condensed information object determines, at the workspace management processing system, performance of at least one aspect of at least one of the plurality of condensed information objects in the customized interactive workspace which has been expanded into a snapshot view, and providing, at the customized interactive workspace, information determined from the interaction, and the workspace processing system provides the determined performance of the least one of the plurality of condensed information objects in the snapshot view in the customized interactive workspace.

41. The system as set forth in claim 35 wherein the workspace processing system stores the customized interactive workspace.

42. The system as set forth in claim 41 wherein the workspace processing system further provides one or more additional customized interactive workspaces to the computing system.

43. The system as set forth in claim 35 wherein the plurality of condensed information objects comprise at least one of financial information, event information, news information, product information or personal information.

44. The system as set forth in claim 35 wherein the workspace processing system generates and stores a user profile associated with the customized interactive workspace based on provided user profile information.

45. The system as set forth in claim 44 wherein the workspace processing system monitors one or more actions relating to the customized interactive workspace and supplements the stored user profile based on the one or more monitored actions.

46. The system as set forth in claim 45 wherein the workspace processing system adjusts at least one of the plurality of condensed information objects and at least one other displayed element in the customized interactive workspace based on the supplemented stored user profile.

47. The system as set forth in claim 44 wherein the workspace processing system monitors completion of one or more training exercises, determines an adjustment to a mastery level rating based on the monitored completion of the one or more training exercises, and stores the determined mastery level rating in the stored user profile, wherein at least the stored mastery level rating in the stored user profile is provided for display in the customized interactive workspace.

48. The system as set forth in claim 35 wherein the workspace processing system completes one or more investment transactions utilizing one or more of the condensed information objects in the customized interactive workspace.

49. The system as set forth in claim 35 wherein the workspace processing system provides a navigation map in the customized interactive workspace to navigate and interact with one or more sections of the customized interactive workspace.

50. The system as set forth in claim 35 wherein the at least one application tool allows changes to how the information is displayed.

51. The system as set forth in claim 35 wherein the customized interactive workspace allows manipulation of the displayed information.

52. The system as set forth in claim 35 wherein the displayed information includes the real time data received from one or more information provider systems for the plurality of condensed information objects.

53. The system as set forth in claim 35 wherein the displayed information includes financial data received from one or more information provider systems for the plurality of condensed information objects.

54. The system as set forth in claim 53, wherein the customized interactive workspace provides training with the financial data.

55. The system as set forth in claim 35 wherein the video game display graphical user interface format comprises:
displaying the selected plurality of condensed information objects populated in the customizable interactive workspace through the use of a plurality of graphical icons;
displaying a mastery level rating based on a stored user profile associated with the computing system.

56. The system as set forth in claim 55 wherein the customization system obtains the at least one stream of information based on a stored user profile associated with the computing system.

57. The system as set forth in claim 55 wherein the customization system obtains a selection of at least one real-time communication system and wherein and the workspace processing system further provides the customized interactive workspace based on the obtained selected at least one real-time communication system.

58. The system as set forth in claim 55 wherein the workspace processing system generates at least one of the plurality of condensed information objects and provides the at least one of the plurality of generated condensed information objects for selection by the computing system to add to a default interactive workspace.

59. The system as set forth in claim 55 wherein the interaction between the at least one application tool and the at least one condensed information object determines, at the workspace management processing system, performance of at least one aspect of at least one of the plurality of condensed information objects, and the workspace provides the determined performance in the at least one of the plurality of condensed information objects in the customized interactive workspace.

60. The system as set forth in claim 55 wherein the workspace processing system resets the customized interactive workspace to the default interactive workspace.

61. The system of claim 55, wherein the video game display graphical user interface format further comprises presenting one or more training exercises based on the mastery level rating.

62. The system as set forth in claim 61 wherein the workspace processing system obtains and executes the selection of an engagement of a real-time communication system while remaining in the customized interactive workspace.

63. The system of claim 61, wherein at least one training exercise is not presented until the mastery level rating reaches a predetermined level.

64. The system of claim 55, wherein at least one of the plurality of application tools is not available for selection until the mastery level rating reaches a predetermined level.

65. The system of claim 55, wherein at least one of the plurality of condensed information objects are only available for selection upon the mastery level rating exceeding a predetermined level.

66. The system of claim 35, wherein the selection of the plurality of application tools depends on the selected plurality of condensed information objects populated in the customizable interactive workspace, such that the selection of the plurality of application tools is contextual.

67. A method for interacting with and manipulating information, the method comprising:
displaying at least one customized interactive workspace for interacting with information in a video game display graphical user interface format;
providing a plurality of condensed information objects in the customized interactive workspace, at least one of plurality of condensed information objects visually representing at least one stream of information from an information provider system, the at least one stream of information including dynamically changing data, the at least one of the plurality of condensed information objects varying visually according to the dynamically changing data from the at least one stream of information without requiring user input via the customized interactive workspace;
providing a plurality of application tools;
receiving a selection of at least one application tool and at least one condensed information object;
performing at least one action on the at least one information object via the at least one application tool;
displaying the customized interactive workspace based on a feature operation; and
displaying information, at the customized interactive workspace, determined from the at least one action performed on the at least one condensed information object via the at least one application tool.

68. The method as set forth in claim 67 further comprising creating one or more additional customized interactive workspaces.

69. The method as set forth in claim 67 wherein the at least one action comprises at least one of analyzing, sorting, searching, locating, displaying, creating, moving, dragging, dropping, flipping, opening, closing, selecting, organizing, spatially arranging in the customized interactive workspace, grouping, storing, adding, removing, sending, receiving or entering one or more of the condensed information objects.

70. The method as set forth in claim 67 wherein the plurality of condensed information objects comprise at least one of general information, financial information, event information, news information, marketing information, product information or personal information, in a structured or unstructured format.

71. The method as set forth in claim 67 further comprising allowing, via the at least one application tool, changes to how the information is displayed.

72. The method as set forth in claim 67 further comprising allowing, via the customized interactive workspace, manipulation of the displayed information.

73. The method as set forth in claim 67 further comprising receiving real time data associated with the plurality of condensed information objects from one or more information provider systems, wherein the displayed information includes the real time data.

74. The method as set forth in claim 67 further comprising receiving financial data associated with the plurality of condensed information objects from one or more information provider systems.

75. The method as set forth in claim 74 wherein the customized interactive workspace provides training with the financial data.

76. A system that interacts with and manipulates information, the system comprising:
a display system in a computing system that displays a plurality of selected information objects in an interactive customizable workspace for interacting with information in a video game display graphical user interface format, at least one of the plurality of condensed information objects visually representing at least one stream of information from an information provider system, the at least one stream of information including dynamically changing data, the at least one of the plurality of condensed information objects varying visually according to the dynamically changing data from the at least one stream of information without requiring user input via the customized interactive workspace; and an interaction processing system in the computing system that performs, based on a selection of a plurality of application tools and a plurality of condensed information objects, at least one action on at least one condensed information objects via at least one application tool, wherein the display system displays information, at the customized interactive workspace, determined from the at least one action performed on the at least one condensed information object via the at least one application tool.

77. The system as set forth in claim 76 wherein the display systems displays one or more additional customized interactive workspaces.

78. The system as set forth in claim 76 wherein the at least one action comprises at least one of analyzing, sorting, searching, locating, displaying, creating, moving, dragging, dropping, flipping, opening, closing, selecting, organizing, spatially arranging in the customized interactive workspace, grouping, storing, adding, removing, sending, receiving or entering one or more of the condensed information objects.

79. The system as set forth in claim 76 wherein the plurality of condensed information objects comprise at least one of general information, financial information, event information, news information, marketing information, product information or personal information, in a structured or unstructured format.

80. The system as set forth in claim 76 wherein the at least one application tool allows changes to how the information is displayed.

81. The system as set forth in claim 76 wherein the customized interactive workspace allows manipulation of the displayed information.

82. The system as set forth in claim 76 wherein the displayed information includes the real time data received real time data from one or more information provider systems for the plurality of condensed information objects.

83. The system as set forth in claim 76 wherein the displayed information includes financial data received from one or more information provider systems for the plurality of condensed information objects.

84. The system as set forth in claim 83, wherein the customized interactive workspace provides training with the financial data.

* * * * *

UNITED STATES PATENT AND TRADEMARK OFFICE
CERTIFICATE OF CORRECTION

PATENT NO. : 9,053,196 B2  
APPLICATION NO. : 12/463937  
DATED : June 9, 2015  
INVENTOR(S) : Cordell Ratzlaff et al.

Page 1 of 1

It is certified that error appears in the above-identified patent and that said Letters Patent is hereby corrected as shown below:

IN THE CLAIMS

In Column 17, Line 66 (Claim 38, Line 6), please delete "one" before "condensed."

Signed and Sealed this
Fifth Day of January, 2016

Michelle K. Lee
*Director of the United States Patent and Trademark Office*